US012244689B2

(12) United States Patent
Cheng et al.

(10) Patent No.: US 12,244,689 B2
(45) Date of Patent: Mar. 4, 2025

(54) METHOD AND APPARATUS FOR VERTICAL FEDERATED LEARNING

(71) Applicant: TENCENT TECHNOLOGY (SHENZHEN) COMPANY LIMITED, Guangdong (CN)

(72) Inventors: Yong Cheng, Guangdong (CN); Fangcheng Fu, Guangdong (CN); Pin Xiao, Guangdong (CN); Yangyu Tao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 17/957,740

(22) Filed: Sep. 30, 2022

(65) Prior Publication Data

US 2023/0028606 A1     Jan. 26, 2023

Related U.S. Application Data

(63) Continuation of application No. PCT/CN2021/118259, filed on Sep. 14, 2021.

(30) Foreign Application Priority Data

Sep. 30, 2020   (CN) .......................... 202011064959.3

(51) Int. Cl.
*H04L 9/08*      (2006.01)
*G06N 20/20*     (2019.01)
(Continued)

(52) U.S. Cl.
CPC ........... *H04L 9/0819* (2013.01); *G06N 20/20* (2019.01); *H04L 9/008* (2013.01); *H04L 9/0869* (2013.01); *H04L 9/14* (2013.01); *H04L 9/30* (2013.01)

(58) Field of Classification Search
CPC ......... H04L 9/0819; H04L 9/008; H04L 9/14; H04L 9/30; G06N 20/20
See application file for complete search history.

(56) References Cited

U.S. PATENT DOCUMENTS 11,895,220 B2 *   2/2024  Storm ................ G06Q 30/0623
11,979,174 B1 *   5/2024  Xie .......................... H03M 7/24
(Continued)

FOREIGN PATENT DOCUMENTS

CN         109002861         12/2018
CN         110633805         12/2019
(Continued)

OTHER PUBLICATIONS

Hardy et al., Private federated learning on vertically partitioned data via entity resolution and additively homomorphic encryption, Nov. 29, 2017, All Pages (Year: 2017).*

(Continued)

*Primary Examiner* — Hee Soo Kim
(74) *Attorney, Agent, or Firm* — Crowell & Moring LLP

(57) ABSTRACT

This disclosure relates to a method for vertical federated learning. In multiple participation nodes deployed in a multi-way tree topology, an upper-layer participation node corresponds to k lower-layer participation nodes. After the upper-layer participation node and the k lower-layer participation nodes exchange public keys with each other, the upper-layer participation node performs secure two-party joint computation with the lower-layer participation nodes with a first public key and second public keys as encryption parameters to obtain k two-party joint outputs of a federated model. Further, the upper-layer participation node aggregates the k two-party joint outputs to obtain a first joint model output corresponding to the federated model. As such, a multi-way tree topology deployment-based vertical federated learning architecture is provided, improving the equal- (Continued)

ity of each participation node in a vertical federated learning process.

20 Claims, 9 Drawing Sheets

(51) Int. Cl.
  *H04L 9/00* (2022.01)
  *H04L 9/14* (2006.01)
  *H04L 9/30* (2006.01)

(56) References Cited

U.S. PATENT DOCUMENTS

| | | | |
|---|---|---|---|
| 2020/0358599 A1* | 11/2020 | Baracaldo Angel | G06F 21/6227 |
| 2021/0004718 A1* | 1/2021 | Ren | H04L 9/0825 |
| 2021/0143987 A1* | 5/2021 | Xu | H04L 63/062 |
| 2021/0174243 A1* | 6/2021 | Angel | H04L 9/083 |
| 2022/0004933 A1* | 1/2022 | Gu | G06F 16/9027 |
| 2022/0255764 A1* | 8/2022 | Li | G06F 21/606 |

FOREIGN PATENT DOCUMENTS

| | | | |
|---|---|---|---|
| CN | 110728376 A * | 1/2020 | G06N 20/00 |
| CN | 112132293 | 12/2020 | |
| WO | 2020/185973 | 9/2020 | |

OTHER PUBLICATIONS

Baracaldo, Private federated learning: Learn together without sharing data, Nov. 15, 2019, All Pages (Year: 2019).*
Extended European Search Report issued Jul. 13, 2023 in corresponding European Patent Application No. 21874236.9.
Supplementary European Search Report issued Aug. 1, 2023 in in corresponding European Patent Application No. 21874236.9.
Stephen Hardy et al., "Private Federated Learning on Vertically Partitioned Data Via Entity Resolution and Additively Homomorphic Encryption", arxiv.org, Cornell University Library, 201 OLIN Library Cornell University Ithaca, NY 14853, Nov. 29, 2017 (Nov. 29, 2017), XP081298056.
Baracaldo Nathalie: "Private Federated Learning: Learn Together Without Sharing Data", Nov. 15, 2019 (Nov. 15, 2019), XP093060212, Retrieved from the Internet: URL:https://community.ibm.com/community/user/ai-datascience/blogs/nathalie-baracaldo1/2019/11/15/private-federated-learning-learn-together-without.
International Search Report issued Dec. 16, 2021 in International (PCT) Application No. PCT/CN2021/118259.

* cited by examiner

METHOD AND APPARATUS FOR VERTICAL FEDERATED LEARNING

RELATED APPLICATION

This application is a continuation application of PCT Patent Application No. PCT/CN2021/118259, filed on Sep. 14, 2021, which claims priority to Chinese Patent Application No. 202011064959.3, entitled "COMPUTATION METHOD FOR VERTICAL FEDERATED LEARNING, APPARATUS, DEVICE, AND MEDIUM" and filed with the China Intellectual Property Administration on Sep. 30, 2020, wherein the content of each of the above-referenced applications is incorporated herein by reference in its entirety.

FIELD OF THE TECHNOLOGY

Embodiments of this disclosure relate to the field of federated learning, and particularly to a method for vertical federated learning, an apparatus, a device, and a medium.

BACKGROUND OF THE DISCLOSURE

Federated learning may train a machine learning model by combining data sources of multiple participants and provide model-based reasoning service while keeping data within the domain. It makes multi-department, multi-company, and even multi-industry data cooperation possible, and may also meet requirements of data protection laws and regulations.

Multi-participant vertical federated learning in the related art depends on the participation of a trusted central node. The central node keeps a private key, and each participant keeps a public key, so as to implement encrypted transmission of data between the participants.

Keeping a private key by a central node may bring a high security risk concentrated in the central node.

SUMMARY

The embodiments of this disclosure provide a method for vertical federated learning, an apparatus, a device, and a medium. The technical solutions are as follows.

According to an aspect of this disclosure, a method for vertical federated learning is provided, applied to an upper-layer participation node, the upper-layer participation node corresponding to k lower-layer participation nodes in multiple participation nodes deployed in a multi-way tree topology, a submodel in a federated model being locally deployed in each participation node, k being an integer greater than 1. The method may include distributing a first public key corresponding to the upper-layer participation node to the k lower-layer participation nodes, and acquiring k second public keys corresponding to the k lower-layer participation nodes respectively. The method may further include performing, by the upper-layer participation node, secure two-party joint computation with the k lower-layer participation nodes respectively with the first public key and the k second public keys as encryption parameters, to obtain k two-party joint outputs of the federated model. The secure two-party joint computation may include forward computation for the submodel performed, in a manner of homomorphic encryption, by the upper-layer participation node and a lower-layer participation node jointly using respective data of the upper-layer participation node and the lower-layer participation node. The method may further include aggregating the k two-party joint outputs to obtain a multi-party joint output corresponding to the upper-layer participation node and the k lower-layer participation nodes.

According to an aspect of this disclosure, a method for vertical federated learning is provided, applied to a lower-layer participation node, the lower-layer participation node corresponding to an upper-layer participation node in multiple participation nodes deployed in a multi-way tree topology, a submodel in a federated model being locally deployed in each participation node. The method may include acquiring a first public key corresponding to the upper-layer participation node, and reporting a second public key of the lower-layer participation node to the upper-layer participation node. The upper-layer participation node corresponds to k lower-layer participation nodes, and k is a positive integer. The method may further include performing, by the lower-layer participation node, secure two-party joint computation with the upper-layer participation node with the first public key and the second public key as encryption parameters, to obtain a two-party joint output of the federated model. The secure two-party joint computation may include forward computation for the submodel performed, in a manner of homomorphic encryption, by the upper-layer participation node and the lower-layer participation node jointly using respective data of the upper-layer participation node and the lower-layer participation node.

According to an aspect of this disclosure, an upper-layer participation node is provided, corresponding to k lower-layer participation nodes in multiple participation nodes deployed in a multi-way tree topology, a submodel in a federated model being locally deployed in each participation node, k being an integer greater than 1. The upper-layer participation node may include a memory operable to store computer-readable instructions and a processor circuitry operable to read the computer-readable instructions. When executing the computer-readable instructions, the processor circuitry may be configured to distribute a first public key corresponding to the upper-layer participation node to the k lower-layer participation nodes, and acquire k second public keys corresponding to the k lower-layer participation nodes respectively. The processor circuitry may be further configured to perform secure two-party joint computation with the k lower-layer participation nodes respectively with the first public key and the k second public keys as encryption parameters, to obtain k two-party joint outputs of the federated model. The secure two-party joint computation may include forward computation for the submodel performed, in a manner of homomorphic encryption, by jointly using respective data of the upper-layer participation node and the lower-layer participation node. The processor circuitry may be further configured to aggregate the k two-party joint outputs to obtain a multi-party joint output corresponding to the upper-layer participation node and the k lower-layer participation nodes.

According to an aspect of this disclosure, a lower-layer participation node is provided, corresponding to an upper-layer participation node in multiple participation nodes deployed in a multi-way tree topology, a submodel in a federated model being locally deployed in each participation node, the lower-layer participation node including:

a communication module, configured to report a second public key of the lower-layer participation node to the upper-layer participation node, and acquire a first public key corresponding to the upper-layer participation node, the upper-layer participation node corresponding to k lower-layer participation nodes, and k being a positive integer greater than 1; and a joint computation module, configured to perform secure two-party joint computation with the upper-layer participation node taking the first public key and the second public key as encryption parameters to obtain a two-party joint output of the federated model, the secure two-party joint computation including forward computation performed on the submodels of the two nodes by the upper-layer participation node and the lower-layer participation node by use of respective data in a manner of homomorphic encryption.

According to another aspect of the embodiments of this disclosure, a computer device is provided, including: a processor and a memory, the memory storing at least one instruction, at least one program, a code set or an instruction set, the at least one instruction, the at least one program, the code set or the instruction set being loaded and executed by the processor to implement the method for vertical federated learning according to the foregoing aspects.

According to another aspect of this disclosure, a computer-readable storage medium is provided, the computer-readable storage medium storing at least one instruction, at least one program, a code set or an instruction set, the at least one instruction, the at least one program, the code set or the instruction set being loaded and executed by a processor to implement the method for vertical federated learning according to the foregoing aspects.

Another aspect of this disclosure provides a computer program product, including computer instructions, the computer instructions being stored in a computer-readable storage medium. A processor of a computer device reads the computer instructions from the computer-readable storage medium and executes the computer instructions to cause the computer device to execute the method for vertical federated learning according to the foregoing aspects.

The technical solutions provided in the embodiments of this disclosure include at least the following beneficial effects:

In multiple participation nodes deployed in a multi-way tree topology, an upper-layer participation node corresponds to k lower-layer participation nodes. After the upper-layer participation node and the k lower-layer participation nodes exchange public keys with each other, the upper-layer participation node performs secure two-party joint computation with the lower-layer participation nodes taking a first public key and second public keys as encryption parameters to obtain k two-party joint outputs of a federated model. Further, the upper-layer participation node aggregates the k two-party joint outputs to obtain a first joint model output corresponding to the federated model. As such, a multi-way tree topology deployment-based vertical federated learning architecture is provided, improving the equality of each participation node in a vertical federated learning process. The upper-layer participation node and the lower-layer participation node exchange the public keys with each other, and keep their own private keys, so that the security risk may be shared by each participation node.

DESCRIPTION OF EMBODIMENTS

First, several terms described in the embodiments of this disclosure are briefly introduced.

Federated learning: it trains a machine learning model by combining data sources of multiple participants and provides model-based reasoning service while keeping data within the domain. Federated learning improves the performance of the machine learning model by full use of the data sources of the multiple participants while protecting user privacy and data security. It makes multi-department, multi-company, and even multi-industry data cooperation possible, and may also meet requirements of data protection laws and regulations.

Federated learning may be divided into three types: horizontal federated learning, vertical federated learning, and federated transfer learning.

Figure 1:
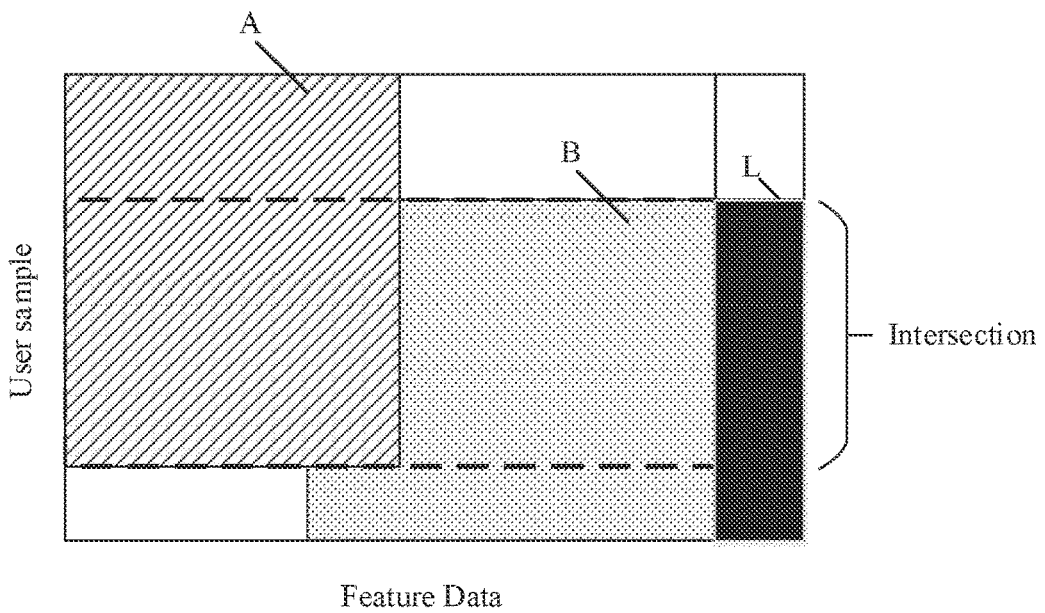
FIG. 1 is a schematic diagram of vertical federated learning according to an exemplary embodiment of this disclosure.

Vertical federated learning: it is federated learning used when training sample Identifiers (IDs) of participants overlap more while data features overlap less. For example, a bank and e-commerce merchant of the same region have different feature data of the same customer A. For example, the bank has financial data of the customer A, while the e-commerce merchant has shopping data of the customer A. "Vertical" is derived from "vertical partitioning" of data. As shown in FIG. 1, different feature data of user samples with overlaps in multiple participants is combined for federated learning. That is, training samples of each participant are vertically partitioned.

Homomorphic encryption: it is a cryptographic technology based on the computational complexity theory of mathematical problems. A result obtained by processing data subjected to homomorphic encryption to obtain an output and decrypting the output is the same as an output result obtained by processing unencrypted original data by the same method.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, smart customer service, digital credit, and financial credit. It is believed that with the development of technologies, the AI technology will be applied to more fields, and play an increasingly important role.

This disclosure provides a technical solution of vertical federated learning. The vertical federated learning does not need a central node for keeping a private key, and each participant may complete model training service by a central-node-free solution. The vertical federated learning may support vertical federated learning of any multiple parties for model training service and model reasoning service of a federated learning task.

Figure 2:
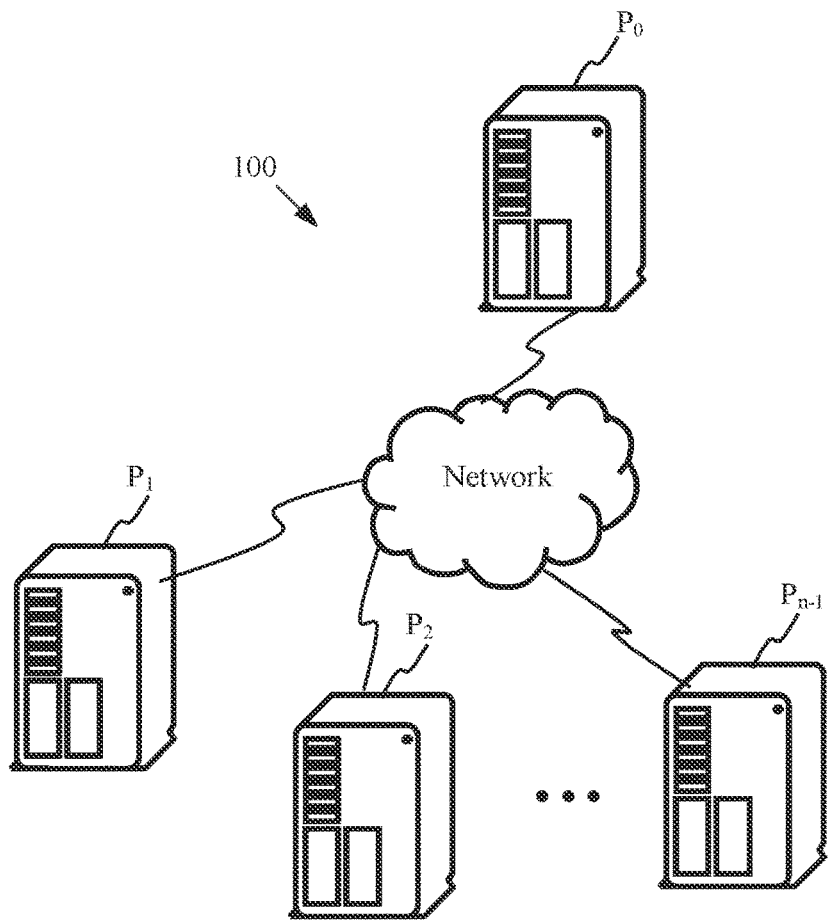
FIG. 2 is a structural block diagram of a computer system according to an exemplary embodiment of this disclosure.

FIG. 2 is a block diagram of a vertical federated learning system 100 according to an exemplary embodiment of this disclosure. The vertical federated learning system supports vertical federated learning collaboratively implemented by N participation nodes (also referred to as participants). The vertical federated learning system 100 includes: an upper-layer participation node $P_0$, and a lower-layer participation node $P_1$ to a lower-layer participation node $P_{N-1}$.

The upper-layer partition node $P_0$ and the lower-layer participation nodes (the lower-layer participation node $P_1$ to the lower-layer participation node $P_{N-1}$) are deployed in a multi-way tree topology. Any participation node may be a server, or multiple servers, or a logical computation module in cloud computing service. Any two participation nodes belong to different data sources, such as data sources of different companies or data sources of different subsidiary companies of the same company.

The upper-layer participation node $P_0$ is a participation node with label information y. The upper-layer participation node $P_0$ may have feature data $X_0$, or may not have feature data $X_0$. For example, the upper-layer participation node $P_0$ is a bank that has a phone number of each user and whether there is any overdue payment record of the user. The phone number of the user is taken as a sample ID, and whether there is any overdue payment record is taken as label information y. Exemplarily, when there are multiple participation nodes with label information, these participation nodes serve as the upper-layer participation node $P_0$ in turn.

The lower-layer participation node $P_i$ has feature data Xi, i=1, 2, ..., N−1. The lower-layer participation node $P_i$ may have label information y, or may not have label information y.

The vertical federated learning system 100 supports collaboration of N participation nodes for safe training of a neural network model. The neural network model includes, but not limited to: a linear regression (LR) model, or a logistic regression (LogR) model, or a support vector machine (SVM) model. N≥3.

The neural network model is also referred to as a federated model. The federated model includes N submodels. A submodel is locally deployed in each participation node. Network parameters in each submodel may be different. Taking the neural network model being a multiple linear regression model $y = W_0 X_0 + W_1 X_1 + W_2 X_2 + W_3 X_3 + W_4 X_4 + W_5 X_5$ as an example, the submodel deployed in the first participation node has a first part of network parameter $W_0$ of the multiple linear regression model, the submodel deployed in the second participation node has a second part of parameters Wi and $W_2$ of the multiple linear regression model, the submodel deployed in the third participation node has a third part of network parameters $W_3$ and $W_4$ of the multiple linear regression model, and so on. The network parameters of the submodels deployed in all the participation nodes form all network parameters of the multiple linear regression model.

The upper-layer participation node $P_0$ has a second public key $PK_j$, i=1, 2, ..., N−1 of the lower-layer participation node $P_j$. The second public keys $PK_i$ of different lower-layer participation nodes are different. The lower-layer participation node $P_i$(i=1, 2, ..., N−1) has a first public key $PK_0$ of the upper-layer participation node $P_0$. Each lower-layer participation node has the same first public key $PK_0$. Any participation node does not disclose its own private key to the other participation nodes. The public key is used for encrypting an intermediate computation result in model training. An encryption algorithm used in this disclosure is an additive homomorphic encryption algorithm. The additive homomorphic encryption algorithm may be a Paillier homomorphic encryption algorithm.

The upper-layer participation node $P_0$ generates a first random mask $R_i$, i=1, 2, ..., N−1 for the lower-layer participation node $P_i$. Different lower-layer participation nodes correspond to different first random masks. The lower-layer participation node $P_i$(i=1, 2, ..., N−1) generates a second random mask $R_{0,i}$ for the upper-layer participation node $P_0$. Different lower-layer participation nodes correspond to different second random masks. Any participation node does not disclose a plain text of any random mask to the other participation nodes. The random mask is used for protecting the intermediate computation result in model training to avoid the network parameters of the neural network model being reversely computed according to model output values of multiple sets of training samples.

In model training, the upper-layer participation $P_0$ collaborates with the lower-layer participation node $P_i$ to perform secure two-party joint computation without disclosing any training sample:

$$z_{0,i} = \frac{1}{N-1}(W_0 + R_{0,i})X_0 + (W_i + R_i)X_i, i = 1, 2, \ldots, N-1;$$

where $\{W_i, i=1, 2, \ldots, N-1\}$ represents a model parameter of the neural network model. The secure two-party joint computation $\{z_{0,i}, i=1, 2, \ldots, N-1\}$ between the upper-layer participation node $P_0$ and the lower-layer participation node $P_i$ may be performed in parallel at (N−1) parties, so as to improve the efficiency.

In another implementation, $z_{o,i}$ is computed through the following formula:

$$z_{0,i} = (W_0 + R_{0,i})X_0 + (W_i + R_i)X_i, i=1,2,\ldots,N-1.$$

That is, a weight $$\frac{1}{N-1}$$

in the above implementation is an optional weight.

The upper-layer participation node $P_0$ computes a joint model output $z = \sum_{i=1}^{N-1} z_{0,i}$ and predicted model output $\hat{y}$ of the neural network model, and computes and transmits a residual $\delta = \hat{y} - y$ (also referred to as an error) to the lower-layer participation node.

The lower-layer participation node $P_i$ locally computes a gradient $g_i$ according to the residual $\delta$, and locally updates the model parameter $W_i$, i=1, 2, ..., N−1.

In this disclosure, multiple participation nodes are organized according to a topological structure like a multi-way tree (including a binary tree), so as to reduce requirements for computation and communication capabilities of a single participation node $P_0$.

Figure 3:
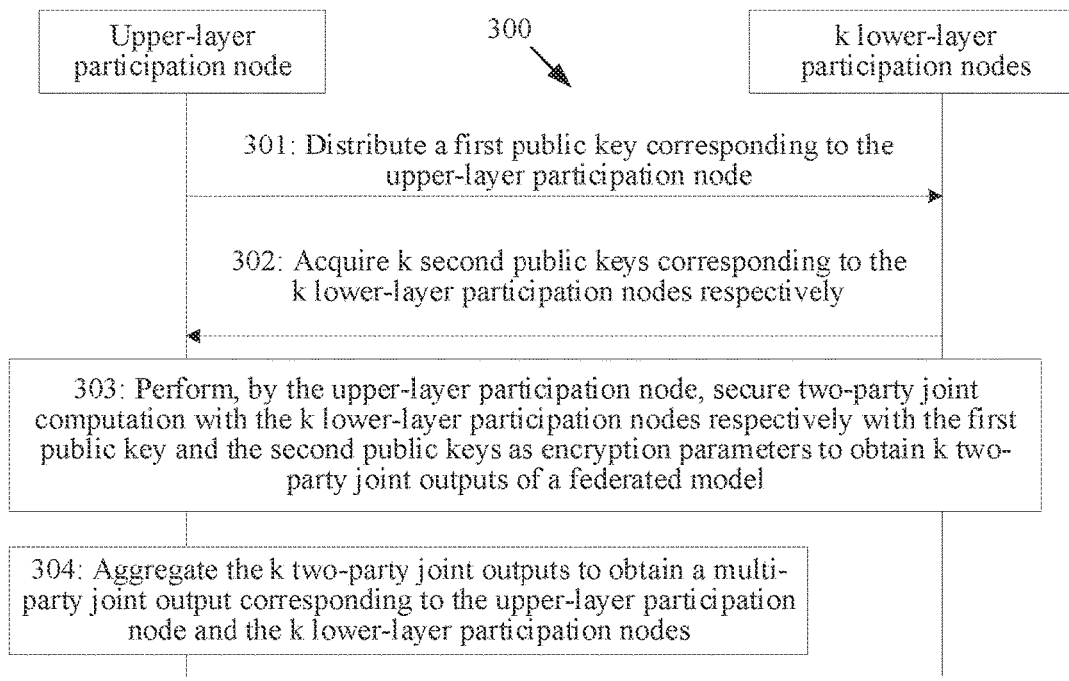
FIG. 3 is a flowchart of a method for vertical federated learning according to another exemplary embodiment of this disclosure.

FIG. 3 is a flowchart of a method 300 for vertical federated learning according to an exemplary embodiment of this disclosure. The method 300 is applied to at least two layers (all layers or part of layers) of participation nodes deployed in a multi-way tree topology. A star topology is formed between an upper-layer participation node and lower-layer participation nodes. The at least two layers of participation nodes include an upper-layer participation node and k lower-layer participation nodes connected with the upper-layer participation node. The method 300 includes the following steps:

In step 301, the upper-layer participation node distributes a first public key corresponding to the upper-layer participation node to the k lower-layer participation nodes, and the k lower-layer participation nodes acquire the first public key corresponding to the upper-layer participation node.

An upper-layer participation node $P_0$ generates a first public key $PK_0$ and a first private key $SK_0$, and transmits the first public key $PK_0$ to N−1 lower-layer participation nodes $P_i$. The first public key $PK_0$ and the first private key $SK_0$ form a key pair. A cipher text obtained by encryption with the first pubic key $PK_0$ may be decrypted with the first private key $SK_0$ to obtain an original text. A cipher text obtained by encryption with the first private key $SK_0$ may be decrypted with the first public key $PK_0$ to obtain an original text. The first public key $PK_0$ is visible to the lower-layer participation node $P_i$, and the first private key $SK_0$ is invisible to the lower-layer participation node $P_i$.

It is assumed that N is the total number of participation nodes, k is a positive integer greater than N, and N is a positive integer greater than 1.

In step 302, the k lower-layer participation nodes report second public keys to the upper-layer participation node, and the upper-layer participation node acquires the k second public keys corresponding to the k lower-layer participation nodes respectively.

Each lower-layer participation node $P_i$ generates a second public key $PK_i$ and a second private key $SK_i$, and transmits the second public key $PK_i$ to the upper-layer participation node $P_0$. The second public key $PK_i$ and the second private key $SK_i$ form a key pair. A cipher text obtained by encryption with the second pubic key $PK_i$ may be decrypted with the second private key $SK_i$ to obtain an original text. A cipher text obtained by encryption with the second private key $SK_i$ may be decrypted with the second public key $PK_i$ to obtain an original text. The second public key $PK_i$ is visible to the lower-layer participation node, and the second private key $SK_i$ is invisible to the lower-layer participation node. A value of i ranges from 1 to k.

In this embodiment of this disclosure, a sequence of the above two steps is not limited. Steps 301 and 302 may be performed at the same time. Alternatively, step 302 may be performed before or after step 301.

In step 303, the upper-layer participation node performs secure two-party joint computation with the k lower-layer participation nodes respectively taking the first public key and the second public keys as encryption parameters to obtain k two-party joint outputs of a federated model; and correspondingly, each lower-layer participation node performs secure two-party joint computation with the upper-layer participation node taking the first public key and the second public key as encryption parameters to obtain a two-party joint output of the federated model.

The first public key and the second public key are used for encrypting intermediate computation results between the upper-layer participation node and the lower-layer participation node.

The secure two-party joint computation includes forward computation performed on submodels of the two nodes by the upper-layer participation node and the lower-layer participation node by use of respective data in a manner of homomorphic encryption. In a model training phase, data refers to feature data X that the participation node has. In a model prediction phase, data refers to data to be predicted of the participation node.

In step 304, the upper-layer participation node aggregates the k two-party joint outputs to obtain a first joint model output corresponding to the upper-layer participation node and the k lower-layer participation nodes.

The first joint model output is an output obtained by performing forward computation on k submodels according to feature data X corresponding to the upper-layer participation node and the k lower-layer participation nodes.

In summary, according to the method provided in this embodiment, in multiple participation nodes deployed in a multi-way tree topology, an upper-layer participation node corresponds to k lower-layer participation nodes. After the upper-layer participation node and the k lower-layer participation nodes exchange public keys with each other, the upper-layer participation node performs secure two-party joint computation with the lower-layer participation nodes taking a first public key and second public keys as encryption parameters to obtain k two-party joint outputs of a federated model. Further, the upper-layer participation node aggregates the k two-party joint outputs to obtain a first joint model output corresponding to the federated model. As such, a multi-way tree topology deployment-based vertical federated learning architecture is provided, improving the equality of each participation node in a vertical federated learning process. The upper-layer participation node and the lower-layer participation node exchange the public keys with each other, and keep their own private keys, so that the security risk may be shared by each participation node.

Figure 4:
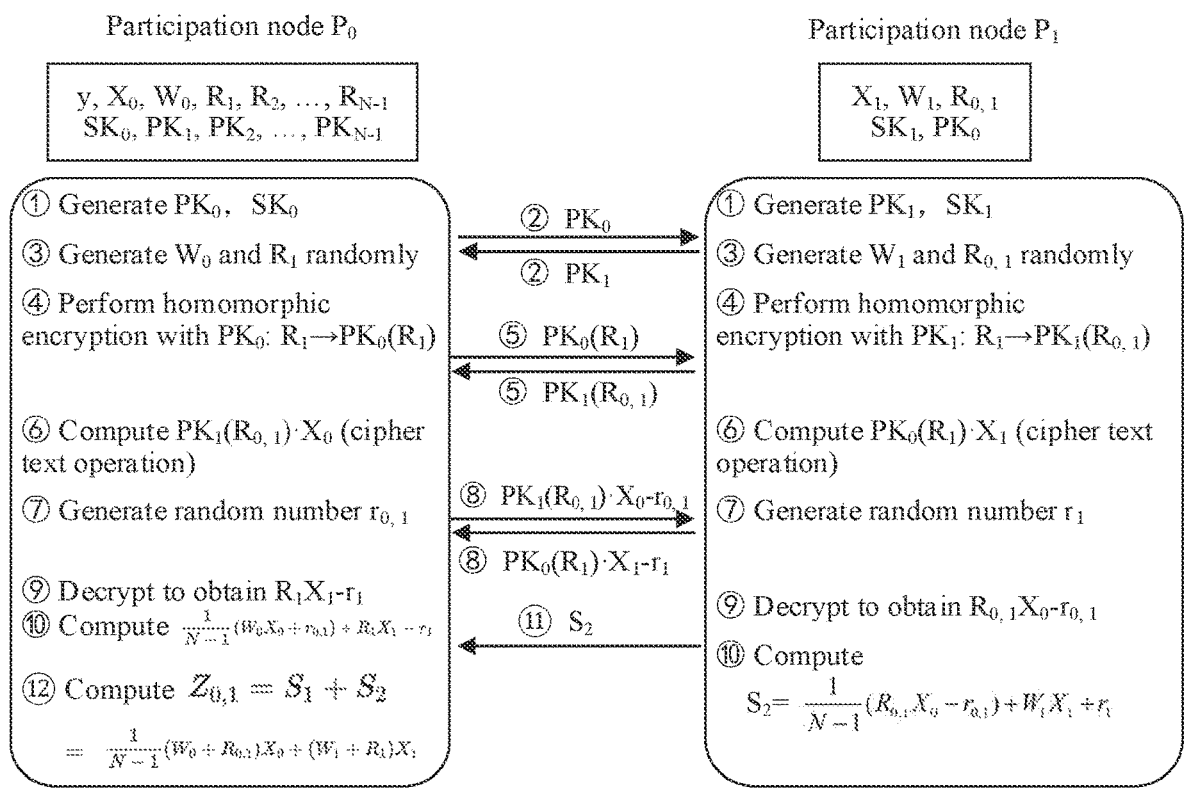
FIG. 4 is a flowchart of a method for secure two-party joint computation by an upper-layer participation node and a lower-layer participation node according to another exemplary embodiment of this disclosure.

FIG. 4 is a flowchart of secure joint computation between two participation nodes according to an exemplary embodiment of this disclosure. An upper-layer participation node $P_0$ performs secure two-party joint computation with an $i^{th}$ lower-layer participation node $P_i$ (FIG. 4 takes a first lower-layer participation node as an example), a value of i ranging from 1 to k. The method includes the following substeps:

In step 1, the upper-layer participation node $P_0$ generates a first public key $PK_0$ and a first private key $SK_0$, and the $i^{th}$ lower-layer participation node $P_i$ generates a second public key $PK_i$ and a second private key $SK_i$.

In step 2, the upper-layer participation node $P_0$ transmits the first public key $PK_0$ to the $i^{th}$ lower-layer participation node $P_i$, and the $i^{th}$ lower-layer participation node $P_i$ transmits the second public key $PK_i$ to the upper-layer participation node $P_0$; and the $i^{th}$ lower-layer participation node $P_i$ stores the first public key $PK_0$, and the upper-layer participation node $P_0$ stores the second public key $PK_i$.

Steps 1 and 2 complete the processes of steps 301 and 302, and will not be elaborated. Step 303 includes the following substeps:

In step 3, the upper-layer participation node $P_0$ generates a first network parameter $W_0$ and a first random mask $R_i$, and the $i^{th}$ lower-layer participation node $P_i$ generates a second network parameter $W_i$ and a second random mask $R_{0,i}$.

The first network parameter $W_0$ is a network parameter of a submodel locally deployed in the upper-layer participation node $P_0$. The second network parameter $W_i$ is a network parameter of a submodel locally deployed in the $i^{th}$ lower-layer participation node $P_i$.

The first random mask $R_i$ is generated by the upper-layer participation node $P_0$, so the first random masks generated by the upper-layer participation node $P_0$ for different lower-layer participation nodes may be the same or different. The second random mask $R_{0,i}$ is generated by each lower-layer participation node, so second random masks generated by different lower-layer participation nodes for the upper-layer participation node $P_0$ are generally different.

In step 4, the upper-layer participation node $P_0$ encrypts the first random mask $R_i$ with the first public key $PK_0$ in a manner of homomorphic encryption to obtain a first encrypted value $PK_0(R_i)$; and the $i$th lower-layer participation node $P_i$ encrypts the second random mask $R_{0,i}$ with the second public key $PK_i$ in a manner of homomorphic encryption to obtain a second encrypted value $PK_i(R_{0,i})$.

In step 5, the upper-layer participation node $P_0$ transmits the first encrypted value $PK_0(R_i)$ to the $i^{th}$ lower-layer participation node $P_i$, and the $i^{th}$ lower-layer participation node $P_i$ transmits the second encrypted value $PK_i(R_{0,i})$ to the upper-layer participation node; and the $i^{th}$ lower-layer participation node $P_i$ receives the first encrypted value $PK_0(R_i)$ transmitted by the upper-layer participation node $P_0$, and the upper-layer participation node $P_0$ receives the second encrypted value $PK_i(R_{0,i})$ transmitted by the $i^{th}$ lower-layer participation node $P_i$.

In step 6, the upper-layer participation node $P_0$ computes a product $PK_i(R_{0,i}) \cdot W_0$ of the second encrypted value $PK_i(R_{0,i})$ and the first network parameter $W_0$, and the $i^{th}$ lower-layer participation node computes a product $PK_i(R_{0,i}) \cdot W_i$ of the first encrypted value $PK_0(R_i)$ and the second network parameter $W_i$.

The second network parameter is a network parameter of the submodel locally deployed in the $i^{th}$ lower-layer participation node.

In step 7, the upper-layer participation node $P_0$ generates a second random number $r_{0,i}$, and the $i^{th}$ lower-layer participation node $P_i$ generates a first random number $r_i$.

The second random number is generated by the upper-layer participation node $P_0$, so the second random numbers generated by the upper-layer participation node $P_0$ for different lower-layer participation nodes may be the same or different. The first random number is generated by each lower-layer participation node, so first random numbers generated by different lower-layer participation nodes for the upper-layer participation node $P_0$ are generally different.

In step 8, the upper-layer participation node $P_0$ transmits a third encrypted value to the $i^{th}$ lower-layer participation node $P_i$, and the upper-layer participation node receives a fourth encrypted value transmitted by the $i^{th}$ lower-layer participation node $P_i$.

The third encrypted value is a value obtained by encrypting first data $X_0$ with the second encrypted value $PK_i(R_{0,i})$ and the second random number $r_{0,i}$. Exemplarily, the third encrypted value is $PK_i(R_{0,i}) \cdot X_0 - r_{0,i}$.

The fourth encrypted value is a value obtained by the $i^{th}$ lower-layer participation node $P_i$ by encrypting second data $X_i$ with the first encrypted value $PK_0(R_i)$ and the first random number $r_i$. Exemplarily, the fourth encrypted value is $PK_0(R_i) \cdot X_i - r_i$.

In step 9, the upper-layer participation node $P_0$ decrypts the fourth encrypted value $PK_i(R_{0,i}) \cdot X_i - r_i$ with the first private key to obtain a masked value $R_i X_i - r_i$ of the second data, and the $i^{th}$ lower-layer participation node $P_i$ decrypts the third encrypted value with the second private key to obtain a masked value $R_0 X_0 - r_{0,i}$ of the first data.

In step 10, the upper-layer participation node $P_0$ computes a first local output $s_1$, and the $i^{th}$ lower-layer participation node $P_i$ computes a second local output $s_2$.

The upper-layer participation node $P_0$ computes the first local output $s_1$:

$$s_1 = \frac{1}{k}(W_0 X_0 + r_{0,1}) + R_1 X_1 - r_1.$$

The $i^{th}$ lower-layer participation node $P_i$ computes the second local output $s_2$:

$$s_2 = \frac{1}{k}(R_{0,1} X_0 - r_{0,1}) + W_1 X_1 + r_1.$$

A weight $1/k$ in the above formulas is an optional weight. In some embodiments, the weight is not needed. That is, the upper-layer participation node $P_0$ computes the first local output $s_2$:

$$s_1 = (W_0 X_0 + r_{0,1}) + R_1 X_1 - r_1.$$

The $i^{th}$ lower-layer participation node $P_i$ computes the second local output $s_2$:

$$s_2 = (R_{0,1} X_0 - r_{0,1}) + W_1 X_1 + r_1.$$

In step 11, the $i^{th}$ lower-layer participation node $P_i$ reports the second local output $s_2$ to the upper-layer participation node $P_0$.

In step 12, the upper-layer participation node $P_0$ adds the first local output and the second local output to obtain an $i^{th}$ two-party joint output $z_{0,i}$.

$$z_{0,i} = \frac{1}{N-1}(W_0 + R_{0,i})X_0 + (W_i + R_i)X_i, i = 1, 2, \ldots, k.$$

Alternatively, $$z_{0,i} = (W_0 + R_{0,i})X_0 + (W_i + R_i)X_i, i = 1, 2, \ldots, k.$$

In an implementation, the secure two-party joint computation between the upper-layer participation node and the k lower-layer participation nodes is performed in parallel. By performing the above steps in parallel, the upper-layer participation node obtains totally k two-party joint outputs of a federated model.

In summary, according to the method provided in this embodiment, a multiple encryption mechanism of public key, random mask and random number is used, so that there is provided a secure two-party joint method where an upper-layer participation node and a lower-layer participation node are substantially in an equal relationship, and in addition, the security of feature data between the upper-layer participation node and a lower-layer participation node may be ensured.

In an implementation based on FIG. 3, when the N participation nodes are deployed in a multi-way tree topology, there are at least two deployment manners.

Two-Layer Multi-Way Tree Topology

The upper-layer participation node is a root node in two layers of participation nodes. The lower-layer participation node is a leaf node in the two layers of participation nodes. Each leaf node is connected with the root node.

Figure 5:
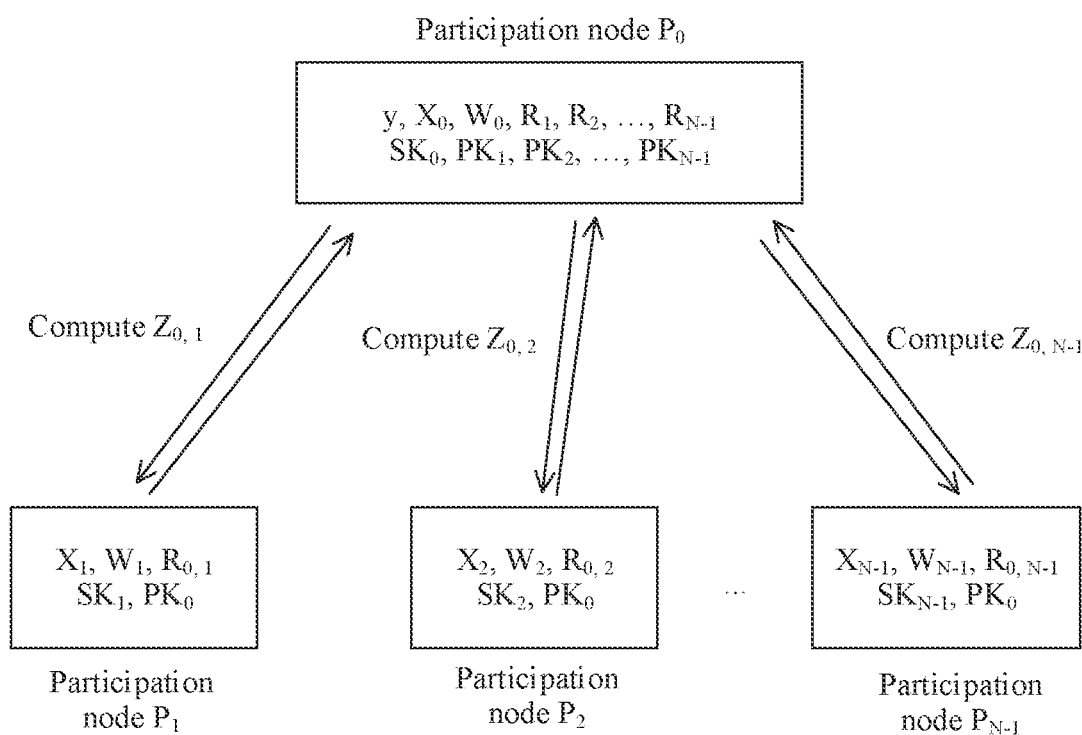
FIG. 5 is a block diagram of N participation nodes deployed in a two-layer multi-way tree topology according to another exemplary embodiment of this disclosure.

As shown in FIG. 5, a participation node $P_0$ serves as an upper-layer participation node, i.e., a root node. N−1 participation nodes $P_i$ serve as lower-layer participation nodes, i=1, 2, . . . , N−1. There is a network connection between the root node and each lower-layer participation node.

Multilayer Multi-Way Tree Topology

Figure 6:
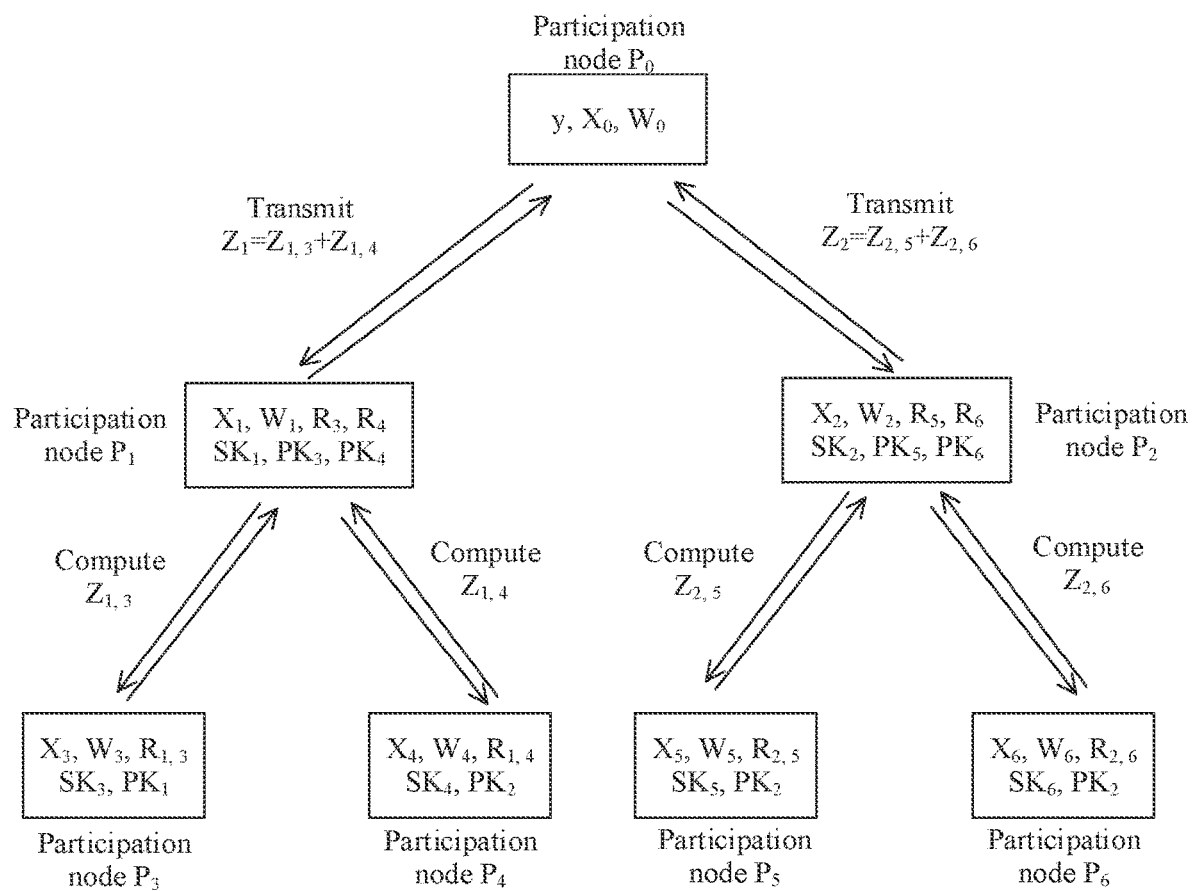
FIG. 6 is a block diagram of N participation nodes deployed in a multilayer multi-way tree topology according to another exemplary embodiment of this disclosure.

The N participation nodes are deployed in a multi-way topology of at least three layers. Two adjacent layers of participation nodes include upper-layer participation nodes and lower-layer participation nodes. The upper-layer participation node is a participation node of the higher layer in the two adjacent layers of participation nodes. The lower-layer participation node is a participation layer of the lower layer in the two adjacent layers of participation nodes. Each lower-layer participation node is connected with the corresponding upper-layer participation node. Each upper-layer participation node corresponds to at least two lower-layer participation nodes. As shown in FIG. 6, taking deploying seven participation nodes in a three-layer multi-way tree topology as an example, a participation node $P_0$ is a first-layer participation node, i.e., a root node, a participation node $P_1$ and a participation node $P_2$ are second-layer participation nodes, and a participation node $P_3$, a participation node $P_4$, a participation node $P_5$, and a participation node $P_6$ are third-layer participation nodes.

The participation node $P_0$ is an upper-layer participation node (or referred to as a higher-layer participation node) of the participation node $P_1$ and the participation node $P_2$. The participation node $P_1$ and the participation node $P_2$ are lower-layer participation nodes of the participation node $P_0$.

The participation node $P_1$ is an upper-layer participation node of the participation node $P_3$ and the participation node $P_4$. The participation node $P_3$ and the participation node $P_4$ are lower-layer participation nodes of the participation node $P_1$. The participation node $P_2$ is an upper-layer participation node of the participation node $P_5$ and the participation node $P_6$. The participation node $P_5$ and the participation node $P_6$ are lower-layer participation nodes of the participation node $P_1$.

For a model training process of the two-layer multi-way tree topology, there are provided the following embodiment.

Figure 7:
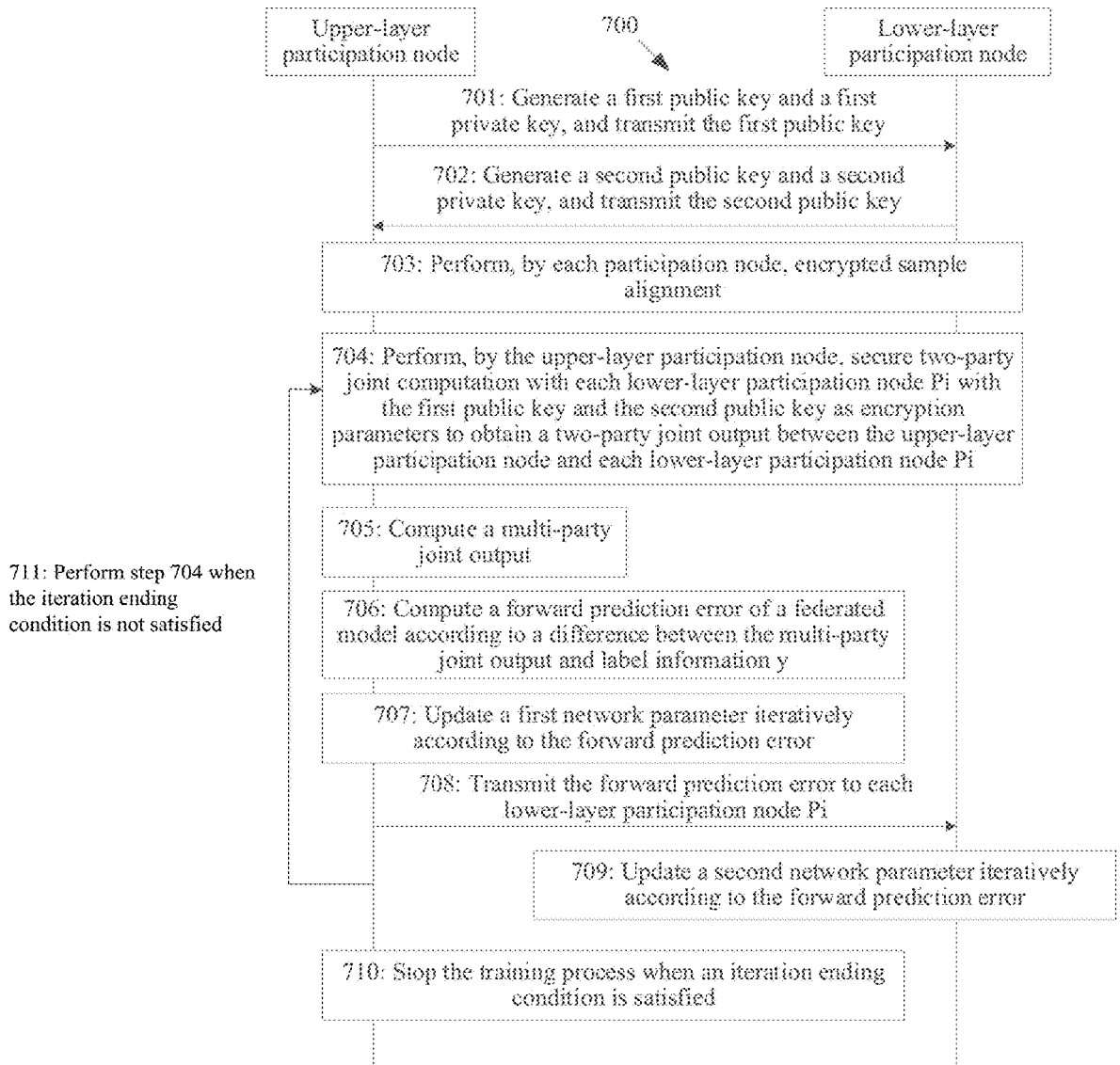
FIG. 7 is a flowchart of a method for vertical federated learning according to another exemplary embodiment of this disclosure.

FIG. 7 is a flowchart of a method 700 for vertical federated learning according to an exemplary embodiment of this disclosure. The method 700 is applied to the upper-layer participation node and N−1 lower-layer participation nodes shown in FIG. 5. Taking a federated model being a logistic regression (LogR) model as an example, the method 700 includes the following steps:

Phase 1: Public Key Distribution

In step 701, the upper-layer participation node $P_0$ generates a first public key $PK_0$ and a first private key $SK_0$, and transmits the first public key $PK_0$ to the N−1 lower-layer participation nodes $P_i$.

The upper-layer participation node $P_0$ generates a public key and private key pair ($PK_0$, $SK_0$), and transmits a first public key $PK_0$ to each lower-layer participation node $P_i$. The N−1 lower-layer participation nodes Pi receive the first public key $PK_0$ transmitted by the upper-layer participation node $P_0$. The N−1 lower-layer participation nodes $P_i$ store the first public key $PK_0$.

The first public key $PK_0$ is used for performing additive homomorphic encryption on an intermediate computation result. For example, a Paillier homomorphic encryption algorithm is used.

In step 702, each lower-layer participation node $P_i$ generates a second public key $PK_i$ and a second private key $SK_i$, and transmits the second public key $PK_i$ to the upper-layer participation node $P_0$; and the upper-layer participation node $P_0$ stores the N−1 public keys $PK_i$, i=1, 2, . . . , N−1. Schematically, the N−1 second public keys $PK_i$ are different.

The second public key $PK_i$ is used for performing additive homomorphic encryption on an intermediate computation result. For example, the Paillier homomorphic encryption algorithm is used.

Phase 2: Encrypted Sample Alignment

In step 703, each participation node performs encrypted sample alignment.

It is assumed that the participation node $P_i$ has a training feature data set $X_i$, i=0, 1, 2, . . . , N−1. The participation node $P_0$ has label information y. The participation node $P_0$ may have no feature data, namely $X_0$ is null.

The N participation nodes of vertical federated learning need to align training samples they have so as to screen out an ID intersection of the training samples they have. That is, an intersection of the training samples corresponding to the same sample ID in the multiple training feature data sets $X_i$, i=0, 1, 2, . . . , N−1 is computed. Disclosure of the training samples beyond the intersection is not allowed. Schematically, this step is to align training samples of multiple participation nodes by use of a Freedman-protocol-based algorithm.

Phase 3: Forward Model Output

In step 704, the upper-layer participation node $P_0$ performs secure two-party joint computation with each lower-layer participation node Pi taking the first public key and the second public key as encryption parameters to obtain a two-party joint output $z_{0,i}$ between the upper-layer participation node $P_0$ and each lower-layer participation node Pi:

$$z_{0,i} = \frac{1}{N-1}(W_0 + R_{0,i})X_0 + (W_i + R_i)X_i, \; i=1, 2, \ldots, N-1,$$

where $\{W_i, i=0, 1, 2, \ldots, N-1\}$ represents a parameter of the federated model.

An algorithm for the secure two-party joint computation between the upper-layer participation node $P_0$ and each lower-layer participation node $P_i$ is not limited. Any secure two-party joint method is available. In this disclosure, the secure two-party joint computation is exemplified with steps 3 to 12 shown in FIG. 4.

Computation of $\{z_{0,i}, i=1, 2, \ldots, N-1\}$ by the upper-layer participation node $P_0$ and each lower-layer participation node Pi may be performed in parallel at the (N−1) lower-layer participation nodes $P_i$, so as to reduce training time of the federated model and improve the efficiency of multi-participant federated learning.

In step 705, the upper-layer participation node $P_0$ computes a multi-party joint output $z_{0,i}$.

After the upper-layer participation node $P_0$ obtains $\{z_{0,i}, i=1, 2, \ldots, N-1\}$ of each lower-layer participation node $P_i$ in a plain text form, the participation node $P_0$ may compute a multi-party joint output z corresponding to the N participation nodes:

$$z = \sum_{i=1}^{N-1} z_{0,i} = \frac{1}{N-1} \sum_{i=1}^{N-1} R_{0,i} X_0 + \sum_{i=0}^{N-1} (W_i + R_i) X_i.$$

In another implementation, z is computed through the following formula:

$$z = \sum_{i=1}^{N-1} z_{0,i} = \sum_{i=1}^{N-1} R_{0,i} X_0 + \sum_{i=1}^{N-1} (W_i + R_i) X_i.$$

That is, $$\frac{1}{N-1}$$

in the above implementation is an optional weight.

Further, the upper-layer participation node $P_0$ may compute a multi-party joint output of the federated model as follows:

$$\hat{y} = \text{sigmoid}(z) = \frac{1}{1 + e^{-z}},$$

where sigmoid is an S function, also referred to as an activation function. E is a natural constant.

Phase 4: Error Back Propagation

In step 706, the upper-layer participation node $P_0$ computes a forward prediction error $\delta$ of a federated model according to a difference between the multi-party joint output $\hat{y}$ and label information y:

$$\delta = \hat{y} - y.$$

In step 707, the upper-layer participation node $P_0$ updates a first network parameter iteratively according to the forward prediction error $\delta$.

After obtaining the forward prediction error $\delta$, the upper-layer participation node $P_i$ locally computes a gradient of a loss function of the federated model for a first network parameter $W_0$. For the federated logistic regression model, the gradient of the loss function for the first network parameter $W_0$ is: $g_0 = \delta X_0$.

The upper-layer participation node $P_0$ locally updates the first network parameter of the federated model: $W_0 \leftarrow W_0 - \eta g_0$, where $\eta$ represents a learning rate. For example, $\eta = 0.01$.

In step 708, the upper-layer participation node $P_0$ transmits the forward prediction error $\delta$; to each lower-layer participation node $P_i$.

In step 709, the lower-layer participation node $P_i$ updates a second network parameter iteratively according to the forward prediction error $\delta$.

Schematically, the upper-layer participation node $P_0$ transmits the forward prediction error $\delta = \hat{y} - y$ to the lower-layer participation node $P_i$ in a plain text or cipher text form, i=1, 2, . . . , N−1.

After obtaining the forward prediction error $\delta$, the lower-layer participation node $P_i$ locally computes a gradient of the loss function of the federated model for a first network parameter $W_i$. For the logistic regression model, the gradient of the loss function for the second network parameter $W_i$ is: $g_i = \delta X_i$, i=1, 2, . . . , N−1.

The lower-layer participation node $P_i$ locally updates the second network parameter of the federated model: $W_i \leftarrow W_i - \eta g_i$, where $\eta$ represents a learning rate. For example, $\eta = 0.01$.

In step 710, step 704 is performed when an iteration ending condition is not satisfied.

The iteration ending condition includes that: an iteration count is greater than a maximum iteration count, or, the network parameter of the federated model converges.

In step 711, the training process is stopped when the iteration ending condition is satisfied.

In summary, according to the method provided in this embodiment, in multiple participation nodes deployed in a multi-way tree topology, an upper-layer participation node corresponds to k lower-layer participation nodes. After the upper-layer participation node and the k lower-layer participation nodes exchange public keys with each other, the upper-layer participation node performs secure two-party joint computation with the lower-layer participation nodes taking a first public key and second public keys as encryption parameters to obtain k two-party joint outputs of a federated model. Further, the upper-layer participation node aggregates the k two-party joint outputs to obtain a first joint output corresponding to the federated model. As such, a multi-way tree topology deployment-based vertical federated learning architecture is provided, improving the equality of each participation node in a vertical federated learning process. The upper-layer participation node and the lower-layer participation node exchange the public keys with each other, and keep their own private keys, so that the security risk may be shared by each participation node.

According to the method provided in this method, a root node and N−1 leaf nodes are constructed in a star topology, which is prone to the implementation of the service in actual scenarios. The whole vertical federated learning process may be completed equally only if any participation node with label information communicates with the other participation nodes as a root node.

In an implementation based on FIG. 7, when an upper-layer participation node is unable to meet requirements for computation and communication capabilities, multiple different upper-layer participation nodes may be used to share computation and communication tasks. Multiple participation nodes are organized according to a topological structure like a multilayer multi-way tree.

For a model training process of the multi-layer multi-way tree topology, there are provided the following embodiment.

Figure 8:
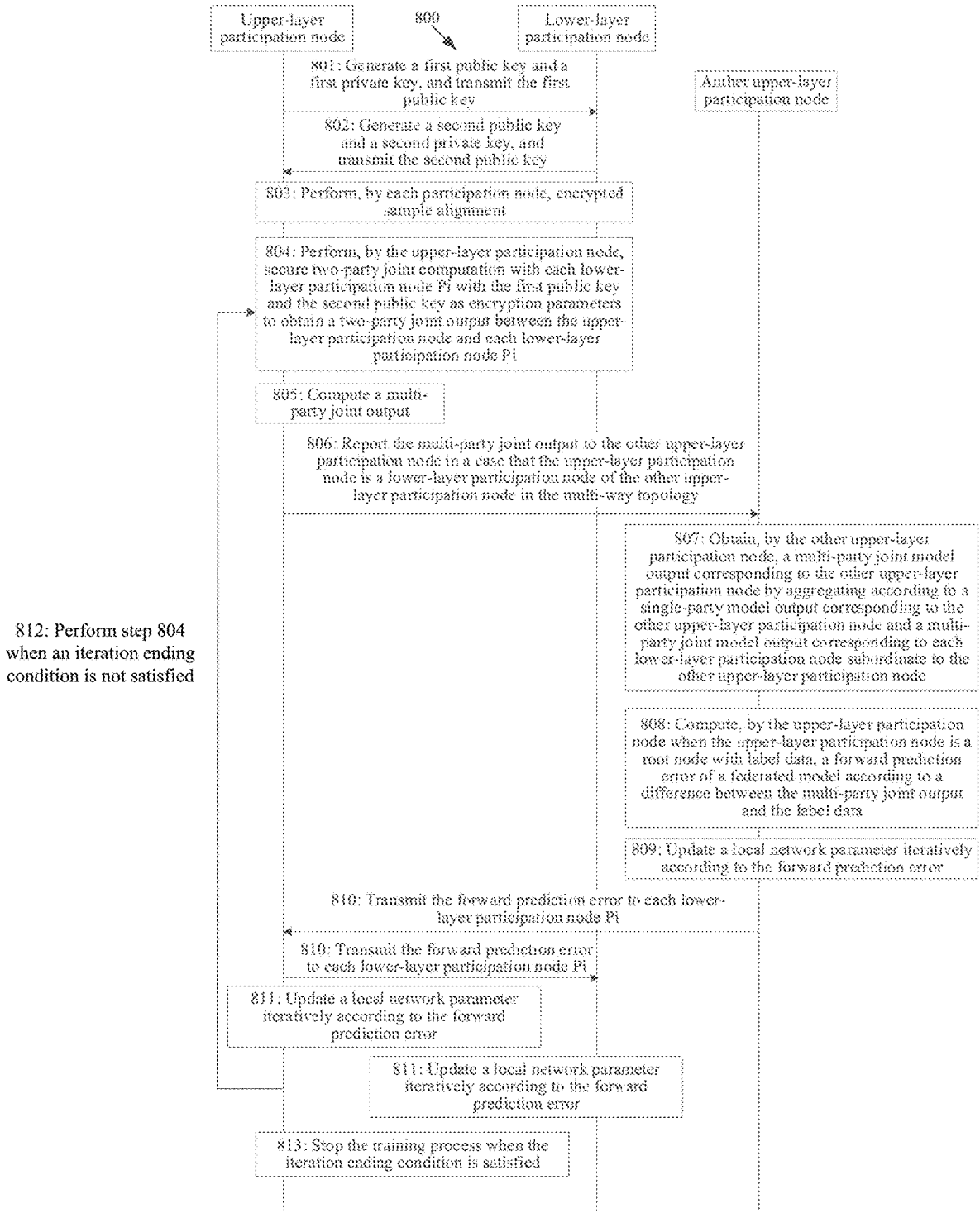
FIG. 8 is a flowchart of a method for vertical federated learning according to another exemplary embodiment of this disclosure.

FIG. 8 is a flowchart of a method 800 for vertical federated learning according to an exemplary embodiment of this disclosure. The method 800 is applied to the upper-layer participation node and lower-layer participation nodes shown in FIG. 6. The method 800 includes the following steps:

Phase 1: Public Key Distribution

In step 801, the upper-layer participation node generates a first public key and a first private key, and transmits the first public key to the k lower-layer participation nodes.

Taking the second-layer participation nodes as upper-layer participation nodes as an example, the upper-layer participation node includes: the participation node $P_1$ and the participation node $P_2$.

For the upper-layer participation node $P_1$, the upper-layer participation node $P_1$ generates a public key and private key pair ($PK_1$, $SK_1$), and transmits a first public key $PK_1$ to the lower-layer participation node $P_3$ and $P_4$. The lower-layer participation nodes $P_3$ and $P_4$ receive the first public key $PK_i$ transmitted by the upper-layer participation node $P_1$. The lower-layer participation nodes $P_3$ and $P_4$ store the first public key $PK_1$.

The first public key $PK_1$ is used for performing additive homomorphic encryption on an intermediate computation result. For example, a Paillier homomorphic encryption algorithm is used.

For the upper-layer participation node $P_2$, the upper-layer participation node $P_2$ generates a public key and private key pair $(PK_2, SK_2)$, and transmits a first public key $PK_2$ to the lower-layer participation node $P_5$ and $P_6$. The lower-layer participation nodes $P_5$ and $P_6$ receive the first public key $PK_2$ transmitted by the upper-layer participation node $P_2$. The lower-layer participation nodes $P_5$ and $P_6$ store the first public key $PK_2$.

The first public key $PK_2$ is used for performing additive homomorphic encryption on an intermediate computation result. For example, a Paillier homomorphic encryption algorithm is used.

In step 802, each lower-layer participation node $P_i$ generates a second public key $PK_i$ and a second private key $SK_i$, and transmits the second public key $PK_i$ to the upper-layer participation node.

For the upper-layer participation node $P_1$, the lower-layer participation node $P_3$ generates a public key and private key pair $(PK_3, SK_3)$, and transmits a second public key $PK_3$ to the upper-layer participation node $P_1$. The lower-layer participation node $P_4$ generates a public key and private key pair $(PK_4, SK_4)$, and transmits a second public key $PK_4$ to the upper-layer participation node $P_1$. The upper-layer participation node $P_1$ receives the second public key $PK_3$ transmitted by the lower-layer participation node $P_3$ and the second public key $PK_4$ transmitted by the lower-layer participation node $P_4$. The upper-layer participation node $P_1$ stores the second public keys $PK_3$ and $PK_4$.

The second public keys $PK_3$ and $PK_4$ are used for performing additive homomorphic encryption on an intermediate computation result. For example, the Paillier homomorphic encryption algorithm is used.

For the upper-layer participation node $P_2$, the lower-layer participation node $P_5$ generates a public key and private key pair $(PK_5, SK_5)$, and transmits a second public key $PK_5$ to the upper-layer participation node $P_2$. The lower-layer participation node $P_6$ generates a public key and private key pair $(PK_6, SK_6)$, and transmits a second public key $PK_6$ to the upper-layer participation node $P_2$. The upper-layer participation node $P_2$ receives the second public key $PK_5$ transmitted by the lower-layer participation node $P_5$ and the second public key $PK_6$ transmitted by the lower-layer participation node $P_6$. The upper-layer participation node $P_2$ stores the second public keys $PK_5$ and $PK_6$.

The second public keys $PK_5$ and $PK_6$ are used for performing additive homomorphic encryption on an intermediate computation result. For example, the Paillier homomorphic encryption algorithm is used.

Phase 2: Encrypted Sample Alignment

In step 803, each participation node performs encrypted sample alignment.

It is assumed that a participation node $P_i$ has a training feature data set $X_j$, i=0, 1, 2, ..., N−1. A participation node $P_0$ has label information y. The participation node $P_0$ may have no feature data, namely $X_0$ is null.

The N participation nodes of vertical federated learning need to align training samples they have so as to screen out an ID intersection of the training samples they have. That is, an intersection of the training samples corresponding to the same sample ID in the multiple training feature data sets $X_j$, i=0, 1, 2, ..., N−1 is computed. Disclosure of the training samples beyond the intersection is not allowed. This step is to align training samples of multiple participation nodes by use of a Freedman-protocol-based algorithm.

Phase 3: Forward Model Output

In step 804, the upper-layer participation node performs secure two-party joint computation with each lower-layer participation node taking the first public key and the second public key as encryption parameters to obtain a two-party joint output $z_{j,i}$ between the upper-layer participation node $P_j$ and each lower-layer participation node $P_i$:

$$z_{j,i} = \frac{1}{N-1}(W_j + R_{j,i})X_j + (W_i + R_i)X_i, i = 1, 2, \ldots, k,$$

where $\{W_i, i=0, 1, 2, \ldots, k\}$ represents a parameter of a federated model. Similarly, $W_j$ also represents a parameter of the federated model.

The upper-layer participation node $P_1$ performs secure two-party joint computation with the lower-layer participation nodes $P_3$ and $P_4$ respectively to obtain submodel outputs $z_{1,3}$ and $z_{1,4}$, where $$z_{1,3} = \frac{1}{3-1}(R_{1,3} + W_1)X_1 + (W_3 + R_3)X_3;$$

$$z_{1,4} = \frac{1}{3-1}(R_{1,4} + W_1)X_1 + (W_4 + R_4)X_4;$$

The upper-layer participation node $P_2$ performs secure two-party joint computation with the lower-layer participation nodes $P_5$ and $P_6$ respectively to obtain submodel outputs $z_{2,5}$ and $z_{2,6}$, where $$z_{2,5} = \frac{1}{3-1}(R_{2,5} + W_2)X_2 + (W_5 + R_5)X_5;$$

$$z_{2,6} = \frac{1}{3-1}(R_{2,6} + W_2)X_2 + (W_6 + R_6)X_6;$$

An algorithm for the secure two-party joint computation between the upper-layer participation node $P_j$ and each lower-layer participation node $P_i$ is not limited. Any secure two-party joint method is available. In this disclosure, the secure two-party joint computation is exemplified with steps 3 to 12 shown in FIG. 4.

The process of performing the secure two-party joint computation by the upper-layer participation node and each lower-layer participation node may be performed in parallel at the k lower-layer participation nodes, so as to reduce training time of the federated model and improve the efficiency of multi-participant federated learning.

In step 805, the upper-layer participation node computes a multi-party joint output.

The upper-layer participation node $P_1$ aggregates the submodel outputs $z_{1,3}$ and $z_{1,4}$ to obtain a multi-party joint output $Z_1$ corresponding to the participation node $P_1$, the participation node $P_3$, and the participation node $P_4$. The multi-party joint output $Z_1$ represents a multi-party joint output corresponding to k+1=3 participants.

The upper-layer participation node $P_2$ aggregates the submodel outputs $z_{2,5}$ and $z_{2,6}$ to obtain a multi-party joint output $Z_2$ corresponding to the participation node $P_2$, the participation node $P_5$, and the participation node $P_6$. The multi-party joint output $Z_2$ represents a multi-party joint output corresponding to k+1=3 participants.

In step 806, the multi-party joint output is reported, when the upper-layer participation node is a lower-layer participation node of a higher-layer participation node in the multi-way tree topology, to the higher-layer participation node.

The higher-layer participation node is an upper-layer participation node of the upper-layer participation node. The upper-layer participation node reports the first joint output to the higher-layer participation node in a plain text or cipher text form.

The upper-layer participation node $P_1$ reports the first joint output $Z_1$ to the higher-layer participation node $P_0$.

The upper-layer participation node $P_2$ reports the first joint output $Z_2$ to the higher-layer participation node $P_0$.

In step 807, the higher-layer participation node obtains a multi-party joint model output corresponding to the higher-layer participation node by aggregating according to a single-party model output corresponding to the higher-layer participation node and a multi-party joint model output corresponding to each lower-layer participation node subordinate to the higher-layer participation node.

After obtaining $z_1$ and $z_2$ in the plain text form, the upper-layer participation node $P_0$ aggregates its own single-party model output $W_0X_0$, and computes a multi-party joint output corresponding to the upper-layer participation node $P_0$ and all of its subordinate lower-layer participation nodes: $z=z_1+z_2+W_0X_0$.

The multi-party joint output represents a joint output corresponding to seven participation nodes.

Further, the upper-layer participation node $P_0$ may compute a multi-party joint output of the federated model as follows.

$$\hat{y} = \text{sigmoid}(z) = \frac{1}{1+e^{-z}},$$

where sigmoid is an S function, also referred to as an activation function. E is a natural constant.

Phase 4: Error Back Propagation

In step 808, the upper-layer participation node computes, when the upper-layer participation node is a root node with label information, a forward prediction error of a federated model according to a difference between the multi-party joint output and the label information.

The upper-layer participation node $P_0$ computes a forward prediction error $\delta$ of the federated model according to a difference between the multi-party joint output $\hat{y}$ and label information y:

$$\delta = \hat{y} - y.$$

In step 809, the upper-layer participation node $P_0$ updates a first network parameter iteratively according to the forward prediction error $\delta$.

After obtaining the forward prediction error $\delta$, the upper-layer participation node $P_i$ locally computes a gradient of a loss function of the federated model for a first network parameter $W_0$. For the federated model, the gradient of the loss function for the first network parameter $W_0$ is: $g_0=\delta X_0$.

The upper-layer participation node $P_0$ locally updates the first network parameter of the federated model: $W_0 \leftarrow W_0 - \eta g_0$, where $\eta$ represents a learning rate. For example, $\eta=0.01$.

In step 810, the upper-layer participation node $P_0$ transmits the forward prediction error $\delta$: to each lower-layer participation node $P_i$.

In step 811, the lower-layer participation node $P_i$ updates a second network parameter iteratively according to the forward prediction error $\delta$.

Schematically, the upper-layer participation node $P_0$ transmits the forward prediction error $\delta=\hat{y}-y$ to the lower-layer participation node $P_i$ in a plain text or cipher text form, i=1, 2, . . . , N−1.

After obtaining the forward prediction error $\delta$, the lower-layer participation node $P_i$ locally computes a gradient of the loss function of the federated model for a first network parameter $W_i$. For the federated model, the gradient of the loss function for the second network parameter $W_i$ is: $g_i=\delta X_i$, i=0, 1, 2, . . . , N−1.

The lower-layer participation node $P_i$ locally updates the second network parameter of the federated model: $W_i \leftarrow W_i - \eta g_i$, where $\eta$ represents a learning rate. For example, $\eta=0.01$.

In step 812, step 806 is performed when an iteration ending condition is not satisfied.

The iteration ending condition includes that: an iteration count is greater than a maximum iteration count, or, the network parameter of the federated model converges.

In step 813, the training process is stopped when the iteration ending condition is satisfied.

Since the outputs of the participation nodes $P_1$ and $P_2$ are already mixed with multi-party outputs, in the above-mentioned embodiment, the participation node $P_0$ may implement computation with the participation nodes $P_1$ and $P_2$ directly in the plain text form without sharing the public keys and using additive homomorphic encryption or random masks. Certainly, the participation node $P_0$ may still select to compute z with the participation nodes $P_1$ and $P_2$ by secure two-party joint computation. That is, the participation node $P_0$ still shares the public keys and random masks with the participation nodes $P_1$ and $P_2$ to compute z by secure two-party joint computation shown in FIG. 4, except that the participation node $P_1$ determines the three-party joint output corresponding to the "participation nodes $P_1$, $P_3$, and $P_4$" as its own model output and the participation node $P_2$ determines the three-party joint output corresponding to the "participation nodes $P_2$, $P_5$, and $P_6$" as its own model output.

In summary, according to the method provided in this embodiment, N participation nodes are deployed in a multilayer multi-way tree topology, so that computation and communication are shared by different upper-layer participation nodes. Therefore, the computation and communication pressure of a participation node serving as a root node is alleviated.

In addition, since an upper-layer participation node has collects a multi-party joint output of k+1 parties, communication between the upper-layer participation node and a higher-layer participation node does not need encrypted communication and encrypted computation. Therefore, the computation overhead and communication overhead of each upper-layer participation node are reduced.

The model training process is illustrated in the embodiments shown in FIGS. 7 and 8. In the model prediction phase, it is only necessary to replace the feature data X with input data and perform the same process ending with the forward computation process, and it is unnecessary to perform the error back propagation process.

In a schematic example, the method is applied to the field of finance, and the federated model is a financial risk control model constructed by use of a multiple linear regression equation. The label information is whether there is any overdue payment record of a user. The participation nodes represent different companies, such as a bank, an e-commerce company, an instant messaging company, and an enterprise the user works for. The feature data includes, but not limited to: basic attribute information and deposit record of the user (bank), a shopping record of the user (e-commerce company), a social relation chain of the user (instant messaging company), and salary data of the user (enterprise the user works for).

Vertical federated learning makes multi-department, multi-company, and even multi-industry data cooperation possible, and may also meet requirements of data protection laws and regulations. Therefore, an application scenario of vertical federated learning is not limited in this disclosure.

Figure 9:
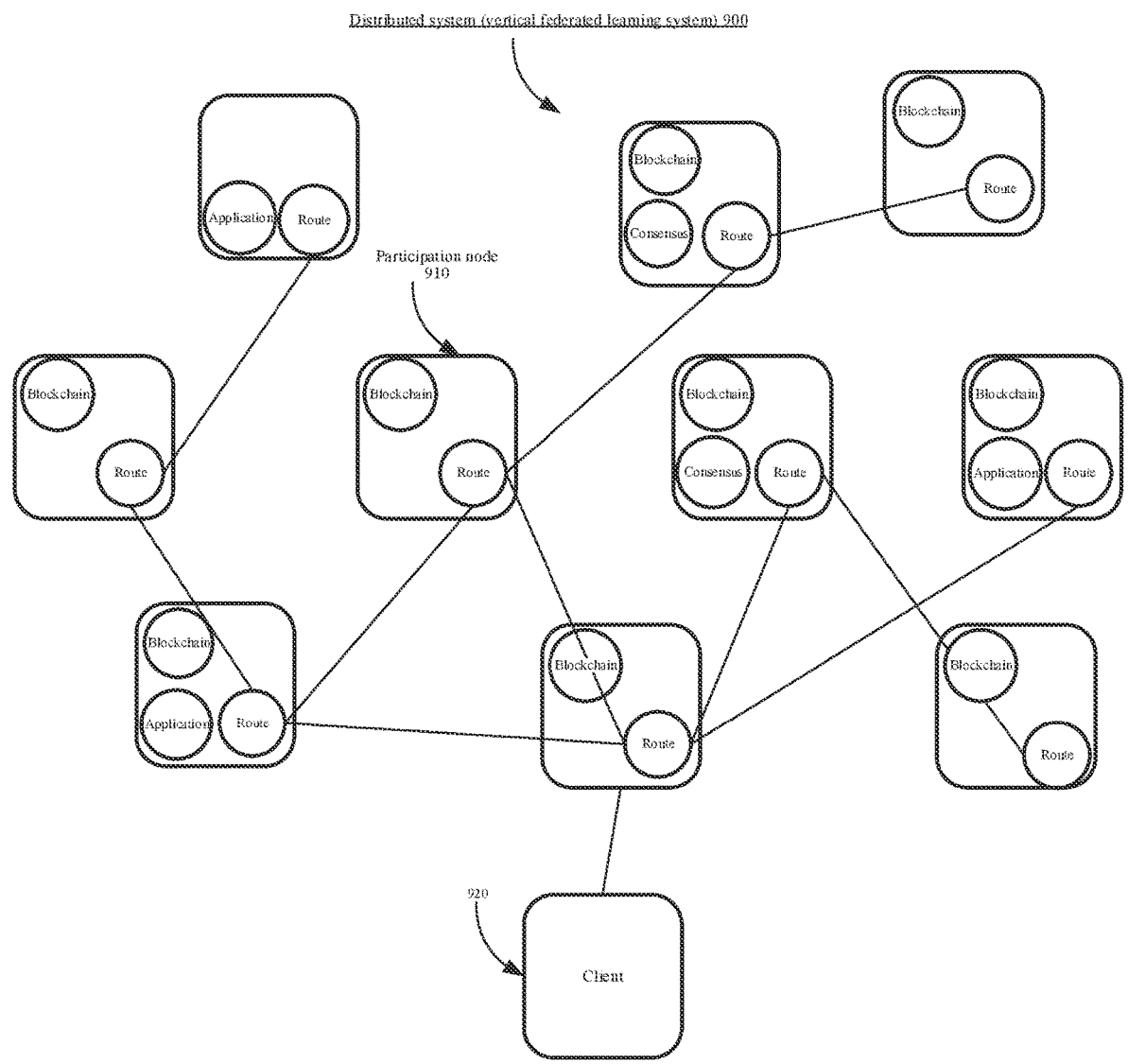
FIG. 9 is a block diagram of a distributed system according to an exemplary embodiment of this disclosure.

FIG. 9 shows a vertical federated learning system involved in an exemplary embodiment of this disclosure. The system may be a distributed system formed by connecting a client and multiple participation nodes (computation devices in any form in an access network, such as servers and user terminals) in a network communication form. For example, the distributed system is a blockchain system. Referring to FIG. 9, FIG. 9 is a schematic structural diagram of a distributed system 900 applied to a blockchain system according to an exemplary embodiment of this disclosure. The distributed system is formed of a plurality of participation nodes (computing devices in any form in an access network, such as, servers and user terminals) 910 and a client 920. A peer-to-peer (P2P) network is formed between the participation nodes 910. The P2P protocol is an application-layer protocol running over the Transmission Control Protocol (TCP). Any machine such as a server or a terminal may be added to the distributed system to become a participation node. The participation nodes include a hardware layer, an intermediate layer, an operating system layer, and an application layer.

Referring to functions of the participation nodes 910 in the blockchain system shown in FIG. 9, the related functions include the following:

(1) Routing: which is a basic function of the participation node 910, and is used for supporting communication between participation nodes 910.

In addition to the routing function, the participation node 910 may further have the following functions:

(2) Application: which is deployed in a blockchain, and is used for implementing a particular service according to an actual service requirement, recording data related to function implementation to form recorded data, adding a digital signature to the recorded data to indicate a source of task data, and transmitting the recorded data to another participation node 910 in the blockchain system, so that the another participation node 910 adds the recorded data to a temporary block when successfully verifying a source and integrity of the recorded data.

For example, services implemented by the disclosure include, but not limited to:

(2.1) Wallet (or other services): used for providing a transaction function with electronic money, including transaction initiation (that is, a transaction record of a current transaction is transmitted to another participation node in the blockchain system, and the another participation node stores, after successfully verifying the transaction record, recorded data of the transaction to a temporary block in a blockchain in response to admitting that the transaction is valid). Certainly, the wallet further supports querying for remaining electronic money in an electronic money address;

(2.2) Shared account book: used for providing functions of operations such as storage, query, and modification of account data. Recorded data of the operations on the account data is sent to another participation node in the blockchain system. The another participation node stores, after verifying that the account data is valid, the recorded data to a temporary block in response to admitting that the account data is valid, and may further send an acknowledgment to a participation node initiating the operations.

(2.3) Smart contract: which is a computerized protocol, may be used for executing conditions of a contract, and is implemented by using code that is deployed in the shared ledger and that is executed when a condition is satisfied. The code is used for completing, according to an actual service requirement, an automated transaction, for example, searching for a delivery status of goods purchased by a purchaser, and transferring electronic money of the purchaser to an address of a merchant after the purchaser signs for the goods. Certainly, the smart contract may also execute contracts for processing received information, not limited to executing contracts for transactions.

(3) Blockchain: including a series of blocks that are consecutive in a chronological order of generation. Once a new block is added to the blockchain, the new block is no longer removed. The block records recorded data committed by the participation node in the blockchain system.

Figure 10:
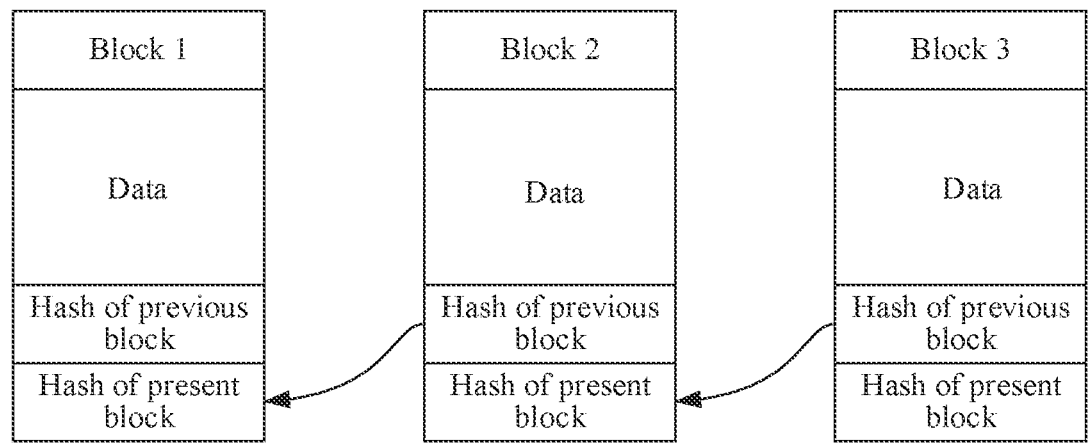
FIG. 10 is a schematic diagram of a block structure according to an exemplary embodiment of this disclosure.

Referring to FIG. 10, FIG. 10 is a schematic diagram of a block structure according to an exemplary embodiment of this disclosure. Each block includes a hash value of a transaction record stored in the current block (a hash value of the current block) and a hash value of a previous block. Blocks are connected according to hash values to form a blockchain. In addition, the block may further include information such as a timestamp indicating a block generation time. A blockchain is a decentralized database essentially, and is a series of associated data blocks generated by using a cryptographic method. Each data block includes related information, and is configured to verify the validity (anti-counterfeiting) of the information of the data block, and generate a next block.

Figure 11:
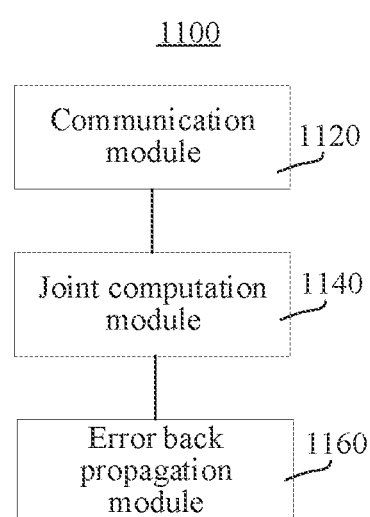
FIG. 11 is a block diagram of an upper-layer participation node according to another exemplary embodiment of this disclosure.

FIG. 11 is a block diagram of an upper-layer participation node 1100 (or referred to as an upper-layer participation apparatus) according to an exemplary embodiment of this disclosure. The upper-layer participation node 1100 corresponds to k lower-layer participation nodes in multiple participation nodes deployed in a multi-way tree topology, and a submodel in a federated model is locally deployed in each participation node, k being an integer greater than 1. The upper-layer participation node includes:

a communication module 1120, configured to distribute a first public key corresponding to the upper-layer participation node to the k lower-layer participation nodes, and acquire k second public keys corresponding to the k lower-layer participation nodes respectively;

a joint computation module 1140, configured to perform secure two-party joint computation with the k lower-layer participation nodes respectively taking the first public key and the second public keys as encryption parameters to obtain k two-party joint outputs of the federated model, the secure two-party joint computation including forward computation performed on the submodels by the upper-layer participation node and the lower-layer participation node by use of respective data in a manner of homomorphic encryption; and an aggregating module, configured to aggregate the k two-party joint outputs to obtain a joint model output corresponding to the upper-layer participation node and the k lower-layer participation nodes.

In this embodiment, the joint computation module 1140 is configured to:

generate a first network parameter and a first random mask, the first network parameter being a network parameter of the submodel locally deployed in the upper-layer participation node;

transmit a first encrypted value to an $i^{th}$ lower-layer participation node, and receive a second encrypted value transmitted by the $i^{th}$ lower-layer participation node, the first encrypted value being obtained by encrypting the first random mask by use of the first public key in a manner of homomorphic encryption, the second encrypted value being obtained by encrypting a second random mask by use of an $i^{th}$ second public key in a manner of homomorphic encryption, and a value of i ranging from 1 to k;

transmit a third encrypted value to the $i^{th}$ lower-layer participation node, and receive a fourth encrypted value transmitted by the $i^{th}$ lower-layer participation node, the third encrypted value being a value obtained by encrypting first data by use of the second encrypted value and a second random number, the fourth encrypted value being a value obtained by the $i^{th}$ lower-layer participation node by encrypting second data by use of the first encrypted value and a first random number, the first data being data in the upper-layer participation node, the second data being data in the $i^{th}$ lower-layer participation node, the second random number being generated by the upper-layer participation node, and the first random number being generated by the lower-layer participation node;

compute a first local output, and receive a second local output transmitted by the $i^{th}$ lower-layer participation node, the first local output being computed according to a decrypted value of the fourth encrypted value, the data of the upper-layer participation node, the first network parameter, and the second random number, and the second local output being computed by the $i^{th}$ lower-layer participation node according to a decrypted value of the third encrypted value, data of the $i^{th}$ lower-layer participation node, a second network parameter, and the first random number; and add the first local output and the second local output to obtain an $i^{th}$ two-party joint output, so as to obtain the totally k two-party joint outputs of the federated model.

In an implementation, the secure two-party joint computation between the upper-layer participation node and the k lower-layer participation nodes is performed in parallel.

In an implementation, the upper-layer participation node is a root node with label information, and the apparatus further includes:

an error back propagation module 1160, configured to compute a forward prediction error of the federated model according to a difference between the multi-party joint model output and the label information, and transmit the forward prediction error to the k lower-layer participation nodes, the forward prediction error being used for the k lower-layer participation nodes to perform back propagation to update second network parameters of the submodels in the k lower-layer participation nodes.

In an implementation, the upper-layer participation node is a lower-layer participation node of a higher-layer participation node in the multi-way tree topology. The communication module 1120 is further configured to report the multi-party joint model output to the higher-layer participation node, the higher-layer participation node being configured to obtain a multi-party joint model output corresponding to the higher-layer participation node by aggregating according to the multi-party joint model output, a single-party model output corresponding to the higher-layer participation node, and a multi-party joint model output corresponding to another lower-layer participation node subordinate to the higher-layer participation node.

In this embodiment, the upper-layer participation node is a lower-layer participation node of a higher-layer participation node in the multi-way tree topology. The communication module 1120 is further configured to report the first public key to the higher-layer participation node, and acquire a third public key corresponding to the higher-layer participation node.

The joint computation module 1140 is configured to perform, by the upper-layer participation node as a lower-layer participation node, secure two-party joint computation with the higher-layer participation node taking the first public key and the third public key as encryption parameters to obtain a two-party joint output of the federated model.

Figure 12:
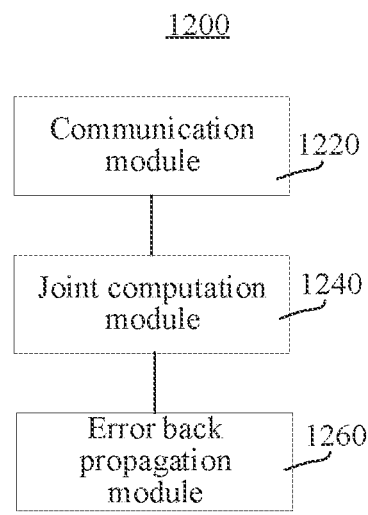
FIG. 12 is a block diagram of a lower-layer participation node according to another exemplary embodiment of this disclosure.

FIG. 12 is a block diagram of a lower-layer participation node 1200 (or referred to as a lower-layer participation apparatus) according to an exemplary embodiment of this disclosure. The lower-layer participation node 1200 corresponds to an upper-layer participation node in multiple participation nodes deployed in a multi-way tree topology, and a submodel in a federated model is locally deployed in each participation node. The lower-layer participation node includes:

a communication module 1220, configured to report a second public key of the lower-layer participation node to the upper-layer participation node, and acquire a first public key corresponding to the upper-layer participation node, the upper-layer participation node corresponding to k lower-layer participation nodes, and k being a positive integer; and a joint computation module 1240, configured to perform secure two-party joint computation with the upper-layer participation node taking the first public key and the second public key as encryption parameters to obtain a two-party joint output of the federated model, the secure two-party joint computation including forward computation performed on the submodels by the upper-layer participation node and the lower-layer participation node by use of respective data in a manner of homomorphic encryption.

In an implementation, the joint computation module 1240 is configured to generate a second network parameter and a second random mask, the second network parameter being a network parameter of the submodel locally deployed in the lower-layer participation node;

receive a first encrypted value transmitted by the upper-layer participation node, and transmit a second encrypted value to the upper-layer participation node, the first encrypted value being obtained by encrypting a first random mask by use of the first public key in a manner of homomorphic encryption, and the second encrypted value being obtained by encrypting the second random mask by use of the second public key in a manner of homomorphic encryption;

receive a third encrypted value transmitted by the upper-layer participation node, and transmitting a fourth encrypted value to the upper-layer participation node, the third encrypted value being a value obtained by encrypting first data by use of the second encrypted value and a second random number, the fourth encrypted value being a value obtained by the lower-layer participation node by encrypting second data by use of the first encrypted value and a first random number, the first data being data in the upper-layer participation node, the second data being data in the lower-layer participation node, the second random number being generated by the upper-layer participation node, and the first random number being generated by the lower-layer participation node; and transmit a second local output to the upper-layer participation node, such that the upper-layer participation node adds a first local output and the second local output to obtain the two-party joint output, the first local output being computed according to a decrypted value of the fourth encrypted value, the data of the upper-layer participation node, a first network parameter, and the second random number, and the second local output being computed by the lower-layer participation node according to a decrypted value of the third encrypted value, the data of the lower-layer participation node, the second network parameter, and the first random number.

In an implementation, the communication module 1220 is configured to receive a forward prediction error transmitted by the upper-layer participation node. The error back propagation module 1260 is configured to perform back propagation according to the forward prediction error to update the second network parameter of the submodel in the lower-layer participation node.

The upper-layer participation node and the lower-layer participation node provided in the foregoing embodiments is described only by using division into the foregoing functional modules as an example. In actual applications, the foregoing functions may be allocated to and completed by different functional modules according to requirements, that is, the internal structure of the device is divided into different functional modules, to complete all or some of the foregoing described functions. In addition, the upper-layer participation node and the lower-layer participation node provided in the foregoing embodiments and the embodiments of the method for vertical federated learning belong to the same concept. For the specific implementation process, reference may be made to the method embodiments.

This disclosure also provides a computer device (terminal or server). The computer device may be implemented as the above-mentioned participation node. The computer device includes a processor and a memory, the memory storing at least one instruction, the at least one instruction being loaded and executed by the processor to implement the method for vertical federated learning provided in the foregoing method embodiments.

Figure 13:
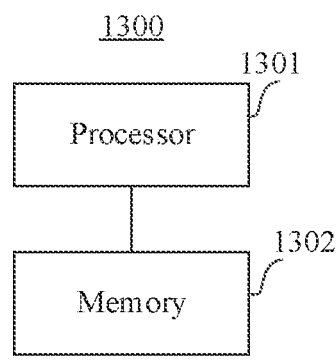
FIG. 13 is a block diagram of a computer device according to another exemplary embodiment of this disclosure.

FIG. 13 is a structural block diagram of a computer device 1300 according to an exemplary embodiment of this disclosure. The computer device 1300 may be: a smartphone, a tablet computer, a moving picture experts group audio layer III (MP3) player, a moving picture experts group audio layer IV (MP4) player, a notebook computer, or a desktop computer. The computer device 1300 may also be referred to as user equipment (UE), a portable computer device, a laptop computer device, a desktop computer device, or another name.

The computer device 1300 usually includes: a processor 1301 and a memory 1302.

The processor 1301 may include one or more processing cores, and may be, for example, a 4-core processor or an 8-core processor. The processor 1301 may be implemented by at least one hardware form in a digital signal processing (DSP), a field-programmable gate array (FPGA), and a programmable logic array (PLA). The processor 1301 may also include a main processor and a co-processor. The main processor is a processor for processing data in a wake-up state, also referred to as a central processing unit (CPU). The coprocessor is a low power consumption processor configured to process data in a standby state. In some embodiments, the processor 1301 may be integrated with a GPU. The GPU is configured to be responsible for rendering and drawing content that a display needs to display. In some embodiments, the processor 1301 may further include an artificial intelligence (AI) processor. The AI processor is configured to process a calculation operation related to machine learning.

The memory 1302 may include one or more computer-readable storage media that may be non-transitory. The memory 1302 may further include a high-speed random access memory and a non-transitory memory, for example, one or more magnetic disk storage devices or flash storage devices. In some embodiments, the non-transitory computer-readable storage medium in the memory 1302 is configured to store at least one instruction, and the at least one instruction being configured to be executed by the processor 1301 to implement the method for vertical federated learning provided in the method embodiments of this disclosure.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

A person skilled in the art may understand that the structure shown in FIG. 13 does not constitute any limitation on the computer device 1300, and the computer device may include more components or fewer components than those shown in the figure, or some components may be combined, or a different component deployment may be used.

The memory further includes one or more programs. The one or more programs are stored in the memory. The one or more programs include a program for performing the method for vertical federated learning provided in the embodiments of this disclosure.

This disclosure further provides a computer-readable storage medium, the storage medium storing at least one instruction, the at least one instruction being loaded and executed by a processor to implement the method for vertical federated learning provided in the foregoing method embodiments.

This disclosure further provides a computer program product, the computer program product, when run on a computer, causing the computer to perform the method for vertical federated learning provided in the foregoing method embodiments.

What is claimed is:

1. A method for vertical federated learning, applied to an upper-layer participation node in multiple participation nodes deployed in a multi-way tree topology, the upper-layer participation node corresponding to k lower-layer participation nodes, a submodel in a federated model being locally deployed in each participation node, k being an integer greater than 1, the method comprising:
distributing a first public key corresponding to the upper-layer participation node to the k lower-layer participation nodes, and acquiring k second public keys corresponding to the k lower-layer participation nodes respectively;
performing, by the upper-layer participation node, secure two-party joint computation with the k lower-layer participation nodes respectively with the first public key and the k second public keys as encryption parameters, to obtain k two-party joint outputs of the federated model, the secure two-party joint computation comprising forward computation for the submodel performed, in a manner of homomorphic encryption, by the upper-layer participation node and a lower-layer participation node jointly using respective data of the upper-layer participation node and the lower-layer participation node; and aggregating the k two-party joint outputs to obtain a multi-party joint output corresponding to the upper-layer participation node and the k lower-layer participation nodes;

wherein the upper-layer participation node is a lower-layer participation node of a higher-layer participation node in the multi-way tree topology, and the method further comprises:

acquiring a third public key corresponding to the higher-layer participation node; and performing, by the upper-layer participation node as a lower-layer participation node, secure two-party joint computation with the higher-layer participation node with the first public key and the third public key as encryption parameters, to obtain a two-party joint output of the federated model.

2. The method according to claim 1, wherein the performing the secure two-party joint computation with the k lower-layer participation nodes respectively to obtain k two-party joint outputs of the federated model comprises:

generating a first network parameter and a first random mask, the first network parameter being a network parameter of a submodel locally deployed in the upper-layer participation node;

transmitting a first encrypted value to an $i^{th}$ lower-layer participation node, and receiving a second encrypted value from the $i^{th}$ lower-layer participation node, the first encrypted value being obtained by encrypting the first random mask using the first public key in a manner of homomorphic encryption, the second encrypted value being obtained by encrypting a second random mask using an $i^{th}$ second public key in a manner of homomorphic encryption, and a value of i ranging from 1 to k;

transmitting a third encrypted value to the $i^{th}$ lower-layer participation node, and receiving a fourth encrypted value from the $i^{th}$ lower-layer participation node, the third encrypted value being a value obtained by encrypting first data using the second encrypted value and a second random number, the fourth encrypted value being a value obtained by the $i^{th}$ lower-layer participation node by encrypting second data using the first encrypted value and a first random number, the first data being data in the upper-layer participation node, the second data being data in the $i^{th}$ lower-layer participation node, the second random number being generated by the upper-layer participation node, and the first random number being generated by the lower-layer participation node;

computing a first local output, and receiving a second local output from the $i^{th}$ lower-layer participation node, the first local output being computed according to a decrypted value of the fourth encrypted value, the data of the upper-layer participation node, the first network parameter, and the second random number, and the second local output being computed by the $i^{th}$ lower-layer participation node according to a decrypted value of the third encrypted value, data of the $i^{th}$ lower-layer participation node, a second network parameter, and the first random number; and adding the first local output and the second local output to obtain an $i^{th}$ two-party joint output, so as to obtain the totally k two-party joint outputs of the federated model.

3. The method according to claim 2, wherein the secure two-party joint computation between the upper-layer participation node and the k lower-layer participation nodes is performed in parallel.

4. The method according to claim 1, wherein the multi-way tree topology comprises:

two layers of participation nodes, the upper-layer participation node being a root node in the two layers of participation nodes, the lower-layer participation node being a leaf node in the two layers of participation nodes, and each leaf node being connected with the root node.

5. The method according to claim 1, wherein the multi-way tree topology comprises:

three or more layers of participation nodes, the upper-layer participation node being a participation node of the higher layer in two adjacent layers of participation nodes, the lower-layer participation node being a participation layer of the lower layer in two adjacent layers of participation nodes, and each lower-layer participation node being connected with a corresponding upper-layer participation node.

6. The method according to claim 1, wherein the upper-layer participation node is a root node with label information, and the method further comprises:

computing a forward prediction error of the federated model according to a difference between the multi-party joint model output and the label information; and transmitting the forward prediction error to the k lower-layer participation nodes, the forward prediction error being for the k lower-layer participation nodes to perform back propagation to update second network parameters of the submodels in the k lower-layer participation nodes.

7. The method according to claim 1, wherein the upper-layer participation node is a lower-layer participation node of a higher-layer participation node in the multi-way tree topology, and the method further comprises:

reporting, by the upper-layer participation node, the multi-party joint model output to the higher-layer participation node, the higher-layer participation node being configured to obtain a multi-party joint model output corresponding to the higher-layer participation node by aggregating the multi-party joint model output, a single-party model output corresponding to the higher-layer participation node, and a multi-party joint model output corresponding to another lower-layer participation node subordinate to the higher-layer participation node.

8. The method according to claim 1, the method further comprises:

reporting, by the upper-layer participation node, the first public key to the higher-layer participation node.

9. A method for vertical federated learning, applied to a lower-layer participation node in multiple participation nodes deployed in a multi-way tree topology, the lower-layer participation node corresponding to an upper-layer participation node, a submodel in a federated model being locally deployed in each participation node, the method comprising:

acquiring a first public key corresponding to the upper-layer participation node, and reporting a second public key of the lower-layer participation node to the upper-layer participation node, the upper-layer participation node corresponding to k lower-layer participation nodes, and k being a positive integer; and performing, by the lower-layer participation node, secure two-party joint computation with the upper-layer participation node with the first public key and the second public key as encryption parameters, to obtain a two-party joint output of the federated model, the secure two-party joint computation comprising forward computation for the submodel performed, in a manner of homomorphic encryption, by the upper-layer participation node and the lower-layer participation node jointly using respective data of the upper-layer participation node and the lower-layer participation node.

10. The method according to claim 9, wherein the performing the secure two-party joint computation with the upper-layer participation node with the first public key and the second public key as encryption parameters comprises:

generating a second network parameter and a second random mask, the second network parameter being a network parameter of the submodel locally deployed in the lower-layer participation node;

receiving a first encrypted value from the upper-layer participation node, and transmitting a second encrypted value to the upper-layer participation node, the first encrypted value being obtained by encrypting a first random mask using the first public key in a manner of homomorphic encryption, and the second encrypted value being obtained by encrypting the second random mask using the second public key in a manner of homomorphic encryption;

receiving a third encrypted value from the upper-layer participation node, and transmitting a fourth encrypted value to the upper-layer participation node, the third encrypted value being a value obtained by encrypting first data using the second encrypted value and a second random number, the fourth encrypted value being a value obtained by the lower-layer participation node by encrypting second data using the first encrypted value and a first random number, the first data being data in the upper-layer participation node, the second data being data in the lower-layer participation node, the second random number being generated by the upper-layer participation node, and the first random number being generated by the lower-layer participation node; and transmitting a second local output to the upper-layer participation node, such that the upper-layer participation node adds a first local output and the second local output to obtain the two-party joint output, the first local output being computed according to a decrypted value of the fourth encrypted value, the data of the upper-layer participation node, a first network parameter, and the second random number, and the second local output being computed by the lower-layer participation node according to a decrypted value of the third encrypted value, the data of the lower-layer participation node, the second network parameter, and the first random number.

11. The method according to claim 9, further comprising:
receiving a forward prediction error from the upper-layer participation node; and
performing back propagation according to the forward prediction error to update the second network parameter of the submodel in the lower-layer participation node.

12. An upper-layer participation node, corresponding to k lower-layer participation nodes in multiple participation nodes deployed in a multi-way tree topology, a submodel in a federated model being locally deployed in each participation node, k being an integer greater than 1, the upper-layer participation node comprising:

a memory operable to store computer-readable instructions; and
a processor circuitry operable to read the computer-readable instructions, the processor circuitry when executing the computer-readable instructions is configured to:

distribute a first public key corresponding to the upper-layer participation node to the k lower-layer participation nodes, and acquire k second public keys corresponding to the k lower-layer participation nodes respectively;

perform secure two-party joint computation with the k lower-layer participation nodes respectively with the first public key and the k second public keys as encryption parameters, to obtain k two-party joint outputs of the federated model, the secure two-party joint computation comprising forward computation for the submodel performed, in a manner of homomorphic encryption, by jointly using respective data of the upper-layer participation node and the lower-layer participation node; and aggregate the k two-party joint outputs to obtain a multi-party joint output corresponding to the upper-layer participation node and the k lower-layer participation nodes;

wherein the upper-layer participation node is a lower-layer participation node of a higher-layer participation node in the multi-way tree topology, and the processor circuitry is further configured to:

acquire a third public key corresponding to the higher-layer participation node; and
perform secure two-party joint computation with the higher-layer participation node with the first public key and the third public key as encryption parameters, to obtain a two-party joint output of the federated model.

13. The upper-layer participation node according to claim 12, wherein the processor circuitry is configured to:

generate a first network parameter and a first random mask, the first network parameter being a network parameter of a submodel locally deployed in the upper-layer participation node;

transmit a first encrypted value to an $i^{th}$ lower-layer participation node, and receive a second encrypted value from the $i^{th}$ lower-layer participation node, the first encrypted value being obtained by encrypting the first random mask using the first public key in a manner of homomorphic encryption, the second encrypted value being obtained by encrypting a second random mask using an $i^{th}$ second public key in a manner of homomorphic encryption, and a value of i ranging from 1 to k;

transmit a third encrypted value to the $i^{th}$ lower-layer participation node, and receive a fourth encrypted value from the $i^{th}$ lower-layer participation node, the third encrypted value being a value obtained by encrypting first data using the second encrypted value and a second random number, the fourth encrypted value being a value obtained by the $i^{th}$ lower-layer participation node by encrypting second data using the first encrypted value and a first random number, the first data being data in the upper-layer participation node, the second data being data in the $i^{th}$ lower-layer participation node, the second random number being generated by the upper-layer participation node, and the first random number being generated by the lower-layer participation node;

compute a first local output, and receive a second local output from the $i^{th}$ lower-layer participation node, the first local output being computed according to a decrypted value of the fourth encrypted value, the data of the upper-layer participation node, the first network parameter, and the second random number, and the second local output being computed by the $i^{th}$ lower-layer participation node according to a decrypted value of the third encrypted value, data of the $i^{th}$ lower-layer participation node, a second network parameter, and the first random number; and add the first local output and the second local output to obtain an $i^{th}$ two-party joint output, so as to obtain the totally k two-party joint outputs of the federated model.

14. The upper-layer participation node according to claim 13, wherein the secure two-party joint computation between the upper-layer participation node and the k lower-layer participation nodes is performed in parallel.

15. The upper-layer participation node according to claim 12, wherein the multi-way tree topology comprises:

two layers of participation nodes, the upper-layer participation node being a root node in the two layers of participation nodes, the lower-layer participation node being a leaf node in the two layers of participation nodes, and each leaf node being connected with the root node.

16. The upper-layer participation node according to claim 12, wherein the multi-way tree topology comprises:

three or more layers of participation nodes, the upper-layer participation node being a participation node of the higher layer in two adjacent layers of participation nodes, the lower-layer participation node being a participation layer of the lower layer in two adjacent layers of participation nodes, and each lower-layer participation node being connected with a corresponding upper-layer participation node.

17. The upper-layer participation node according to claim 12, wherein the upper-layer participation node is a root node with label information, and the processor circuitry is further configured to:

compute a forward prediction error of the federated model according to a difference between the multi-party joint model output and the label information; and transmit the forward prediction error to the k lower-layer participation nodes, the forward prediction error being for the k lower-layer participation nodes to perform back propagation to update second network parameters of the submodels in the k lower-layer participation nodes.

18. The upper-layer participation node according to claim 12, wherein the upper-layer participation node is a lower-layer participation node of a higher-layer participation node in the multi-way tree topology, and the processor circuitry is further configured to:

report the multi-party joint model output to the higher-layer participation node, the higher-layer participation node being configured to obtain a multi-party joint model output corresponding to the higher-layer participation node by aggregating the multi-party joint model output, a single-party model output corresponding to the higher-layer participation node, and a multi-party joint model output corresponding to another lower-layer participation node subordinate to the higher-layer participation node.

19. The upper-layer participation node according to claim 12, wherein the processor circuitry is further configured to:

report the first public key to the higher-layer participation node.

20. The upper-layer participation node according to claim 12, wherein a star topology is formed between the upper-layer participation node and the lower-layer participation nodes.

* * * * *